(12) United States Patent
Nagao

(10) Patent No.: US 11,611,676 B2
(45) Date of Patent: Mar. 21, 2023

(54) IMAGE PROCESSING APPARATUS AND IMAGE PROCESSING METHOD FOR ADDING AND CHANGING IMAGE PROCESSING

(71) Applicant: SHARP KABUSHIKI KAISHA, Sakai (JP)

(72) Inventor: Tsuyoshi Nagao, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/459,944

(22) Filed: Aug. 27, 2021

(65) Prior Publication Data

US 2022/0086303 A1    Mar. 17, 2022

(30) Foreign Application Priority Data

Sep. 15, 2020  (JP) .............................. JP2020-154660

(51) Int. Cl.
*H04N 1/00* (2006.01)
*H04N 1/32* (2006.01)
*G06F 40/143* (2020.01)

(52) U.S. Cl.
CPC ....... *H04N 1/32561* (2013.01); *G06F 40/143* (2020.01); *H04N 1/00411* (2013.01)

(58) Field of Classification Search
CPC ............ H04N 1/32561; H04N 1/00411; G06F 40/143; G06F 3/1297; G06F 3/1298

USPC ................................................. 358/1.13, 1.15
See application file for complete search history.

(56) References Cited

U.S. PATENT DOCUMENTS

2012/0036425 A1* 2/2012 Sato .................... H04N 1/00244
715/234
2012/0113453 A1* 5/2012 Ito ....................... H04N 1/00503
358/1.13

FOREIGN PATENT DOCUMENTS

JP         2009-037627 A     2/2009

\* cited by examiner

*Primary Examiner* — Kent Yip
(74) *Attorney, Agent, or Firm* — ScienBiziP, P.C.

(57) ABSTRACT

An image processing apparatus includes: a processor that executes a script and a native instruction sequence; a controller that instructs execution of an image processing function selected by a user; an operation manager that receives an instruction from the controller and manages progress of plural procedures constituting the image processing function; and a processing module that executes processing according to each of the procedures. The processing module is written as a script, the controller assigns an identifier corresponding to each of different image processing functions and provides a common instruction to the operation manager, and the operation manager calls and executes the processing module corresponding to the assigned identifier via common calling processing to the image processing functions.

4 Claims, 17 Drawing Sheets

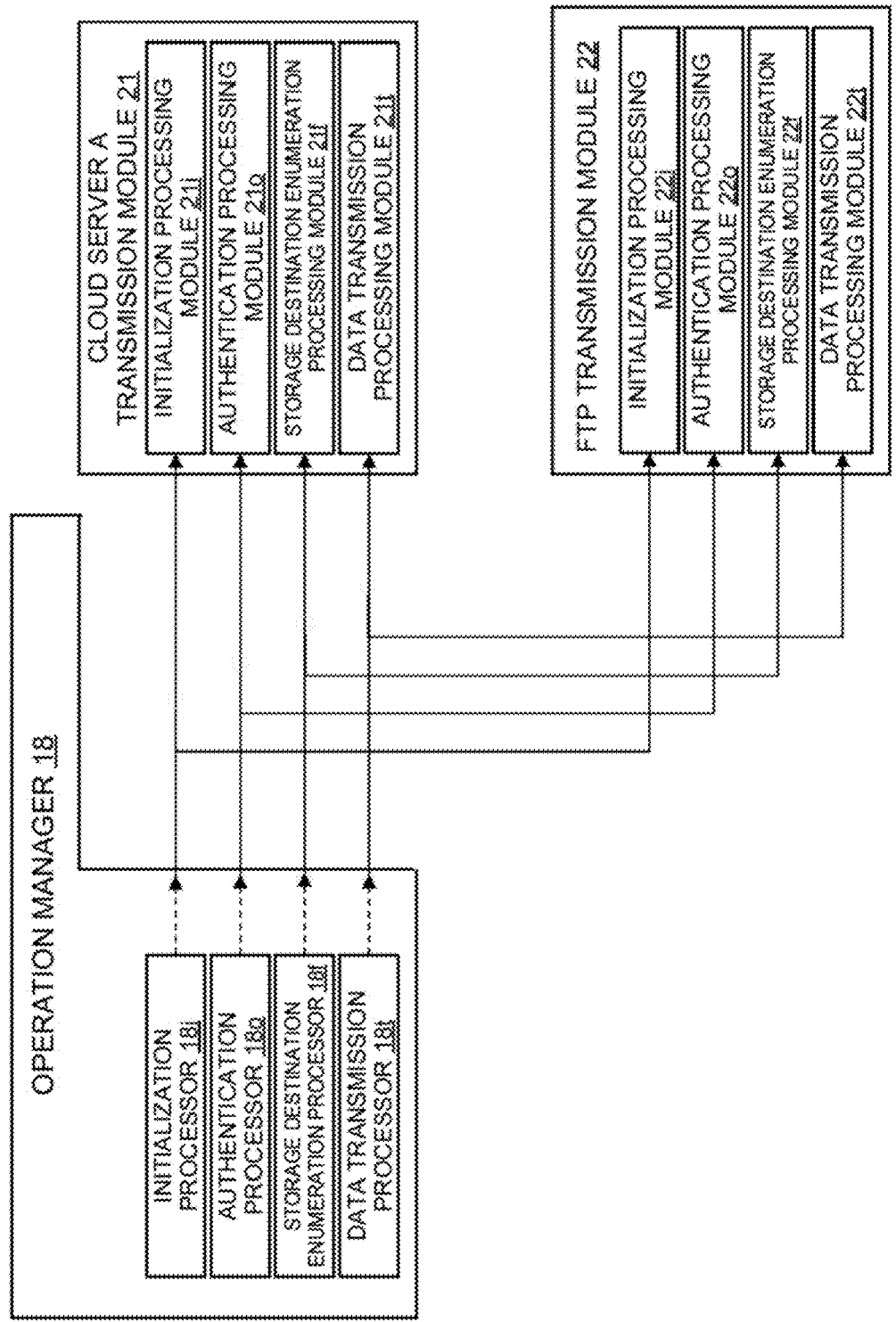

FIG. 10C https://111.222.333.444/manage

FUNCTION MANAGEMENT

| | FUNCTION | VERSION |
|---|---|---|
| ☐ | CLOUD SERVER A TRANSMISSION | 1.1 |

ADD  DELETE

IMAGE PROCESSING APPARATUS AND IMAGE PROCESSING METHOD FOR ADDING AND CHANGING IMAGE PROCESSING

BACKGROUND OF THE INVENTION

Field of the Invention

The present invention relates to an image processing apparatus and an image processing method capable of adding and changing an image processing function.

Description of the Background Art

An image processing apparatus 100 not only performs input/output related to image processing by itself but also often exchanges data related to the image processing with external equipment connected via communication.

Conventionally, the image processing apparatus often exchanges the data only with an information processing apparatus (a host) such as a computer that is connected on a one-to-one basis. However, with the spread of networks, in particular, the Internet, the image processing apparatus increasingly exchanges the data with various types of equipment that are connected via the network. In the case where the data related to the image processing is exchanged with the external equipment via the network, the data is often exchanged according to a standardized communication protocol. An example of the standardized communication protocol is File Transfer Protocol (FTP).

The standardized communication protocol such as the FTP defines basic functions such as uploading and downloading of files. However, in recent years, there has been an increase in the number of businesses that provide more sophisticated services including applications via the network such as cloud services. Reality is that, in regard to an interface for using the cloud service (a service interface), each of the businesses that provides the cloud service defines and provides a unique interface.

The cloud service is based on interaction with the information processing apparatuses such as a personal computer and a smartphone, and those information processing apparatuses each use the cloud service by installing an application that is related to the cloud service or by accessing a specific URL.

The image processing apparatus can execute the image processing of data related to the cloud service via any of those information processing apparatuses. However, in recent years, there has been a strong demand from users who wish to use the cloud services directly from the image processing apparatuses. An example of such a demand is that the user wish to scan a document by operating the image processing apparatus and then directly upload generated data to the cloud service used by the user. Another example of such a demand is that the user wish to access and print the data such as that of the document from the image processing apparatus without interposing the information processing apparatus, and the data is generated by the application related to the cloud service and is stored in the cloud server.

However, the service interface for the cloud service is unique to each of the businesses that provide the cloud services, and is subject to expansion and modification. Thus, the image processing apparatus has to handle ex-post addition, change, or deletion of those service interfaces. It is not easy for the image processing apparatus, which is configured as an embedded system, to fulfill this requirement.

For example, the following techniques have been proposed for a software-embedded image processing apparatus that can dynamically expand types of the executable image processing, that is, the functions of the image processing.

A data structure related to a dynamic enhanced function, an implementation part of an algorithm, and an interpreter for modularizing the dynamic enhanced function are introduced as a virtual operating system in the system. The interpreter interprets a software plug-in module of a virtual machine instruction sequence that is described in intermediate expression (byte codes) generated by compiling a program written in the Java language. Then, the interpreter converts the plug-in module of the virtual machine instruction sequence written in byte codes into a native machine instruction sequence that the processor can execute. In this way, it is configured that the module related to the dynamic enhanced function can be added dynamically on the interpreter. In order to implement a virtual operating system, a stub module and a request broker are interposed in main processing for calling the virtual operating system, and processing of the plugged-in module is executed in the following procedures. This is to make the data structure and the implementation part of the algorithm for processing of the dynamic enhanced function plugged in.

When the interface function of the stub module is called by the main processing, in the main processing, the information on a call request for an interface function is converted into a message, and the message is then further transmitted to the request broker.

When receiving the request message, the request broker interprets the message, restores the call request for the interface function on the basis of the information indicated in the message, and calls a corresponding method in the plug-in module.

When the processing of the method in the plug-in module is completed, the method returns a return value, and returns the control to the request broker.

When the method returns, the request broker generates a response message that is based on information of the return value from the method, and further returns a generated message to the stub module.

When receiving a response message, the stub module completes processing of the first interface function, returns a return value that is based on information on the received response message, and returns the control to the main processing (see FIG. 36 in Japanese Patent Application Publication No. 2009-37627).

As it has been described so far, when the enhanced function is executed, the data structure and the implementation part of the algorithm related to the plugged-in enhanced function is dynamically deployed in the memory, and the processor executes the deployed algorithm, so as to be able to dynamically enhance the function.

However, the technique as disclosed in Japanese Patent Application Publication No. 2009-37627 requires two types of software modules that are the stub module and the request broker in order to operate the data structure and the implementation part of the algorithm related to the dynamic enhanced function in virtual environment. In addition, when the main processing calls and executes the method in the desired plug-in module, the processing is executed via the stub module and the request broker.

A burden of cost is imposed in order to handle a development burden for preparation of the stub module and the request broker and to handle a processing burden by the processor to execute those prepared modules and a burden of required memory resources.

The present invention has been made in consideration of the above circumstances and therefore provide a simple configuration capable of adding, changing, and deleting an executable image processing function and capable of minimizing an influence of the addition, the change, and the deletion on the existing image processing function.

SUMMARY OF THE INVENTION

The present invention provides an image processing apparatus that includes: a processor that executes a script and a native instruction sequence related to image processing; a controller that instructs execution of an image processing function selected by a user; an operation manager that receives an instruction from the controller and manages progress of plural procedures constituting the image processing function; and a processing module that executes processing according to each of the procedures of the image processing function. The processing module is written as a script, the controller assigns each of different image processing functions with an identifier that corresponds to the image processing function, and provides the operation manager with a common instruction to the image processing, and the operation manager calls and executes the processing module that corresponds to the assigned identifier via calling processing that is common to the image processing functions.

From a different perspective, the present invention provides an image processing method in which a processor executing a script and a native instruction sequence related to image processing includes: instructing execution of an image processing function selected by a user; receiving an instruction from a controller and managing progress of plural procedures constituting the image processing function; and executing a processing module in which processing according to each of the procedures of the image processing function is written as a script. In the instruction step, an identifier that corresponds to each of the image processing functions is assigned to the image processing function, and a common instruction to the image processing functions is provided. In the management step, the processing module that corresponds to the assigned identifier is called and executed via calling processing that is common to the image processing functions, so as to be able to add or change the processing step later.

In the image processing apparatus according to the present invention, the processing module is written as the script, and the operation manager calls and executes the processing module that corresponds to the assigned identifier via the calling processing that is common to the image processing functions. Accordingly, it is possible to add, change, and delete the executable image processing function and to minimize an influence of the addition, the change, and the deletion on the existing image processing function with a simple configuration.

The image processing method according to the present invention also exerts similar operational effects.

BRIEF DESCRIPTION OF THE DRAWINGS

FIG. 8 is an explanatory diagram illustrating the processing modules after addition of the function in the present embodiment.

FIG. 10C is a third explanatory view illustrating the operation procedure for deleting the transmission function in the present embodiment.

DESCRIPTION OF THE PREFERRED EMBODIMENTS

A further detailed description will hereinafter be made on the present invention with reference to the drawings. The following description is illustrative in all respects and thus should not be construed as limiting the present invention.

Figure 1:
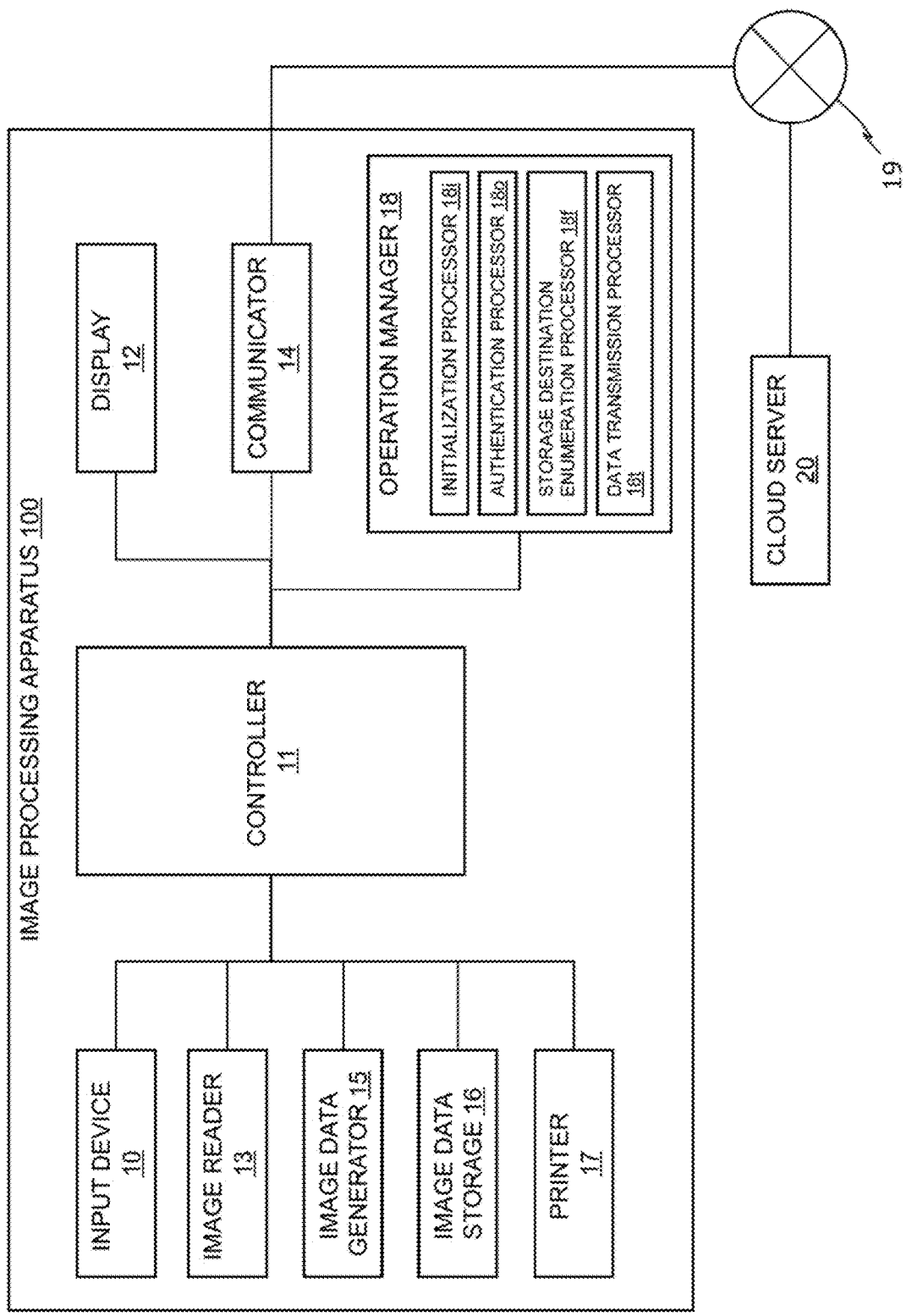
FIG. 1 is a block diagram illustrating a configuration of an image processing apparatus according to the present invention.

FIG. 1 is a block diagram illustrating a configuration of an image processing apparatus according to the present invention. As illustrated in FIG. 1, an image processing apparatus 100 includes an input device 10, a controller 11, a display 12, an image reader 13, and a communicator 14. The image processing apparatus 100 further includes an image data generator 15, an image data storage 16, a printer 17, and an operation manager 18. The image processing apparatus 100 is connected to an external cloud server 20 via a network 19. The cloud server 20 provides a cloud service and stores image data of a target, for which the image processing apparatus 100 executes image processing.

As a specific aspect, the image processing apparatus 100 may be a scanner, a copier, a facsimile machine, a printer, or a multi-function peripheral, for example. However, the image processing apparatus 100 is not limited to any of those. It is assumed that the image processing apparatus 100 illustrated in FIG. 1 is the multi-function peripheral.

In regard to the cloud server 20 in the present embodiment, a business or the like (a service provider) that provides a service defines a unique service interface in advance, and the unique service interface is related to a cloud service, such as data storage, that is provided by the cloud server 20. The image processing apparatus 100 stores the data in the cloud server 20 or accesses the data stored in the cloud server 20 by a procedure according to the service interface that is defined by the service provider. Furthermore, the image processing apparatus 100 uses a service provided by the cloud server 20 other than the data storage.

The controller 11 controls operation, a function, and processing of each of the above-described components including the input device 10 and the display 12 in the image processing apparatus 100.

More specifically, the controller 11 in the present embodiment is constructed of an electronic circuit that includes, as main components, memory and one of a central processing unit (CPU) and a micro processing unit (MPU). Hereinafter, the CPU and the MPU will collectively be referred to as a processor. When the processor runs a control program that is stored in the memory, a hardware resource and a software resource are organically combined to execute a function of the controller 11.

The display 12 shows an operation menu for the image processing by the image processing apparatus 100, and shows and informs a user of a status of the image processing apparatus 100. More specifically, the display 12 in the present embodiment is constructed of a liquid crystal display and an electronic circuit that drives the liquid crystal display.

The input device 10 accepts input from the user. The input device 10 in the present embodiment is constructed of operation keys and a touch panel used to accept the user's operation, and the touch panel is arranged on a display screen of the display 12. The controller 11 recognizes a signal indicating the user's input operation on the input device 10.

The image reader 13 reads an image of a document that is set by the user, and converts the read image into a data signal corresponding to the image. More specifically, the image reader 13 in the present embodiment is constructed of a document feeder, a mechanism that scans the document, and an image sensor that reads the image of the document, and an electronic circuit that drives the image sensor.

The image data generator 15 generates image data that corresponds to the document on the basis of the data signal that is generated by the image reader 13. More specifically, the image reader 13 in the present embodiment is mainly constructed of an electronic circuit and memory related to the image processing.

The communicator 14 communicates with external equipment including the cloud server 20 via the network 19. The communicator 14 in the present embodiment at least includes any of a wireless and/or wired LAN communication interface circuit, an interface circuit for communication by Bluetooth®, and an interface circuit for communication by Universal Serial Bus (USB).

The network 19 can be any communicable network regardless of a system and a type of the network. A typical example of such a network is the Internet. However, the network is not limited thereto. For example, the network may be that with limited accessibility or in a limited area such as an intranet in a business office.

The image data storage 16 stores the image data. A specific aspect thereof is a non-volatile or volatile storage device. The image data storage 16 in the present embodiment is constructed of a combination of flash memory, a hard disk device, and DRAM. The image data storage 16 can store the image data that is generated by the image data generator 15. The image data storage 16 can also store the image data that is received from external equipment (not illustrated in FIG. 1) connected to the cloud server 20 or the network 19 via the communicator 14.

The printer 17 prints the image data. More specifically, the printer 17 in the present embodiment is an electrophotographic printer device. The printer 17 prints the image data that is generated by the image data generator 15. Alternatively, the printer 17 prints the image data that is stored in the image data storage 16. Furthermore, the printer 17 can print the image data that is received from the external equipment (not illustrated in FIG. 1) connected to the cloud server 20 or the network 19 via the communicator 14.

In the present embodiment, based on the user's instruction that is accepted by the input device 10, the controller 11 causes the image reader 13 to read the set document and convert the read document into the data signal, and causes the image data generator 15 to generate the image data. The controller 11 can store the image data generated by the image data generator 15 in the image data storage 16. In addition, the controller 11 can cause the printer 17 to print the image data. Alternatively, the controller 11 can transmit the image data from the communicator 14 to the cloud server 20 via the network 19, and can store the image data in the cloud server 20. Furthermore, the controller 11 can transmit the image data, which is generated by the image data generator 15, to the external equipment (not illustrated in FIG. 1) connected to the network 19.

Moreover, the controller 11 can receive the image data, which is stored in the cloud server 20, from the communicator 14 via the network 19 and can cause the printer 17 to print the image data.

The operation manager 18 is under control of the controller 11 and manages a processing method of the image data. More specifically, the operation manager 18 in the present embodiment is constructed of the common hardware resources with the controller 11, and such hardware resources mainly include the processor and the memory. When the processor runs the control program that is stored in the memory, the hardware resource and the software resource are organically combined to exert a function of the operation manager 18.

The operation manager 18 is configured to call a module that corresponds to a function selected by the user using the input device 10 and to execute processing related to the image processing.

A description will hereinafter be made on a cloud service that is particularly provided by a cloud server 20. As described above, the image processing apparatus 100 has the function of transmitting and storing the image data of the document, which is read by the image reader 13, in the cloud server 20. The image processing apparatus 100 also has the function of receiving the image data stored in the cloud server 20 and printing the image data by the printer 17. That is, the cloud service that is provided by the cloud server 20 includes the transmission function and the printing function. It can be said that the transmission function and the printing function are symmetrical functions from a broad perspective. This is because, while the transmission function is executed to store the image data that is processed by the image processing apparatus 100 in the cloud server 20, the other printing function is executed when the image processing apparatus 100 processes the image data that is stored in the cloud server 20. Thus, only the details of the processing executed by the image processing apparatus 100 and an image data exchanging direction differ between the transmission function and the printing function.

In order to simplify the description, the following description will be focused on the transmission function of the cloud service. Those skilled in the art will readily understand the printing function as a target function. Here, it is assumed that, as the function to be processed by the image processing apparatus 100, the user selects the transmission function to transmit and store the image data in the cloud server 20. In such a case, the controller 11 calls each processor in the operation manager 18 according to a module interface for transmission processing to the cloud server 20.

Here, each of the processors in the operation manager 18 is created on the basis of a predetermined module interface specification. It can be said that such a module interface specification defines the interface between the controller 11 and the operation manager 18. The module interface specification is provided by the business the provides the image processing apparatus 100. Such a module interface specification may be defined as a unique specification by the business or may be defined as a standardized specification not limited by the business.

It can be said that the operation manager 18 executes processing to convert the above-described module interface specification to a service interface specification for the cloud server 20 or to perform the conversion in a reverse direction.

Each of the processors in the operation manager 18 may be created by the business that provides the image processing apparatus 100 on the basis of the module interface specification thereof and the service interface specification for the cloud service provided by the cloud server 20. Alternatively, each of the processors in the operation manager 18 may be created by a person who provides the cloud service related to the cloud server 20. Further alternatively, each of the processors in the operation manager 18 may be created by a third party. A processing module is provided as control software in a module format that is called and executed from the operation manager 18 and can be added and deleted.

Here, each of the processing modules is converted into a native instruction of the processor and is stored in the memory. Accordingly, there is no need to execute each of the processing modules via an interpreter as disclosed in Japanese Patent Application Publication No. 2009-37627.

When transmitting the image data to the cloud server 20, the controller 11 calls each of the processors in the operation manager 18 to execute image data transmission processing. When calling each of the processors in the operation manager 18, the controller 11 provides information on selection of the function by the user. Each of the processors in the operation manager 18 that acquires the information on the selected function from the controller 11 calls the processing module that conforms to the selected function.

The processing module that is called from each of the processors in the operation manager 18 defines a specific processing procedure for transmitting and storing the image data in the cloud server 20. The processor executes actual processing according to the processing module that is called by the operation manager 18.

In other words, since the operation manager 18 is interposed between the controller 11 and the specific processing procedure of each of the processing modules, the controller 11 can call the processing modules having the different processing procedures by the unified module interface.

In the present embodiment, each of the processing modules is written as a script that is executed in response to the operation performed by the user on a screen that is shown on the display 12 by the controller 11. In detail, a content of the screen shown on the display 12 is written in Hyper Text Markup Language (HTML), and processing for the operation that is performed on the shown screen is written in JavaScript. An HTML source and JavaScript may be stored in the memory provided in the controller 11, but may partially or entirely be provided from an external server so as to facilitate distribution and updating.

For example, it is assumed that the cloud service provided by the cloud server 20 is set as a cloud service A and that a different cloud service B is provided on the basis of a different service interface specification.

A case where a transmission function related to the cloud service B is added later will be considered. Even in the case where the service interface specification differs between the cloud service A and the cloud service B, there is no need to change the processing by the controller 11 in association with addition of the cloud service B as long as the controller 11 can process the transmission functions of the cloud service A and the cloud service B by using the common module interface. A new script for a processing module that corresponds to the transmission function of the cloud service B only needs to be prepared and added. When executing the transmission function of the cloud service B, the operation manager 18 only needs to call the script related to the processing module for the cloud service B instead of the processing module for the cloud service A.

The script can be downloaded to the memory in the controller 11 from the external server or the like that provides the processing module for the cloud service B. Alternatively, instead of downloading the script in advance, the latest script related to the processing module may be acquired by accessing the provider's server at the time of calling the processing module. Which script related to the processing module is called is determined by a parameter that the controller 11 passes to the operation manager 18. In this way, calling of the script does not depend on the configuration of the operation manager 18.

Even in the case where a new function that corresponds to the different cloud service is added later, the processing by the controller 11 and the processing by the operation manager 18 are not changed. Thus, there is no need to check the processing modules for the controller 11 and the operation manager 18 that are related to the existing function. The function that is processed by the new processing module for the cloud server B only needs to be checked. A further description will be made below on the addition of the new function as well as the deletion and the change of the function.

The controller 11 calls the processing module, which corresponds to the function, via the operation manager 18 not only when transmitting the image data to the external equipment such as the cloud server 20, for which the unique service interface is defined, but also when transmitting the image data to the external equipment (not illustrated in FIG. 1) connected to the network 19. Here, the external equipment that is connected to the network 19 may transmit the image data by using the standard protocol (for example, the FTP).

Furthermore for example, also when transmitting the image data to the internal component, such as the image data storage 16, in the image processing apparatus 100, the controller 11 may call the processing module that corresponds to the function via the operation manager 18. In this way, it is possible to process the image processing function related to the cloud service and the local image processing function by using the unified module interface.

Figure 2:
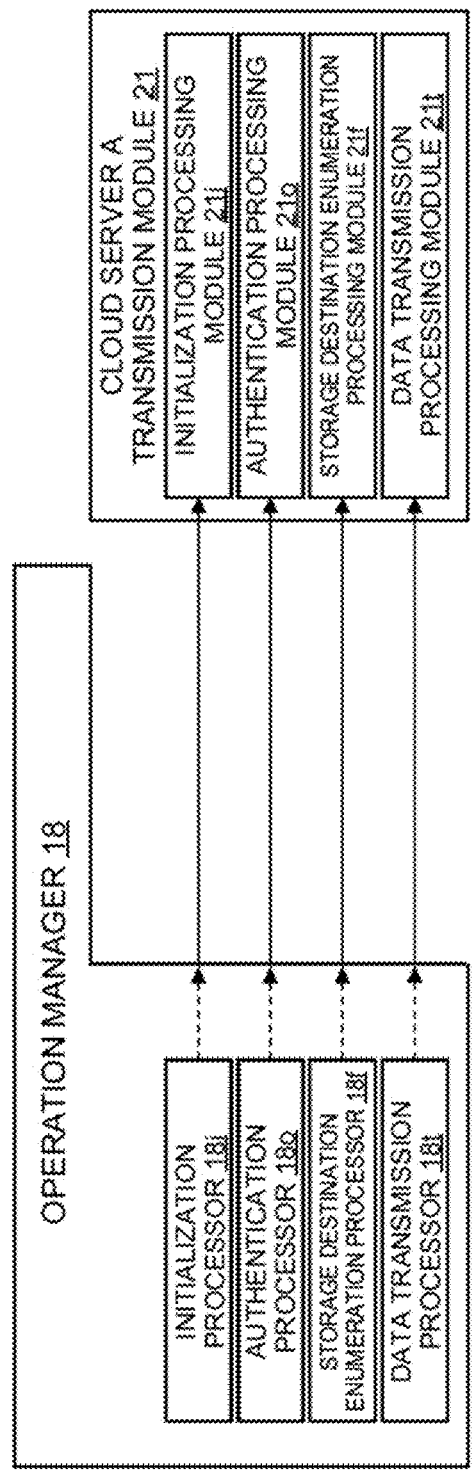
FIG. 2 is an explanatory diagram illustrating relationships of an operation manager illustrated in FIG. 1 with processing modules.

FIG. 2 is an explanatory diagram illustrating relationships of the operation manager 18 illustrated in FIG. 1 with the processing modules. In an example illustrated in FIG. 2, the operation manager 18 includes the processors that are an initialization processor 18$i$, an authentication processor 18$o$, a storage destination enumeration processor 18$f$, and a data transmission processor 18$t$. As described above, as an example of the simplest configuration, FIG. 2 only illustrates the transmission function of the cloud service A, which is provided by the cloud server 20, and does not illustrate a configuration related to the other printing function and the like. In addition, the processing module illustrated in FIG. 2 is only a cloud server A transmission module. In this case, in regard to the transmission function, the cloud server 20 is the only destination of the image data, and there is no other destination option.

The cloud server A transmission module 21 as a set of the processing modules includes processing modules that respectively correspond to the module interfaces of the operation manager 18. More specifically, a script related to an initialization processing module 21$i$ corresponds to the initialization processor 18$i$ in the operation manager 18. A script related to an authentication processing module 21$o$ corresponds to the authentication processor 18$o$ in the operation manager 18. A script related to a storage destination enumeration processing module 21$f$ corresponds to the storage destination enumeration processor 18$f$ in the operation manager 18. A script related to a data transmission processing module 21$t$ corresponds to the data transmission processor 18$t$ in the operation manager 18. The cloud server A transmission module 21 is constructed of those processing modules.

The controller 11 executes the transmission processing to the cloud server A by using the four module interfaces related to initialization processing, authentication processing, storage destination enumeration processing, and data transmission processing. By invoking and executing the scripts related to the corresponding processing modules via those module interfaces, the controller 11 transmits and stores the image data in the cloud server A.

Here, only in the processing that is executed by using the unified module interface, the function can easily be added or deleted by interposing the processing modules for the operation manager 18. A function that does not conform to such a module interface is not included in this category. When being applied to the example illustrated in FIG. 2, the function that can be processed by the controller 11 using the module interfaces provided by the initialization processor 18$i$, the authentication processor 18$o$, the storage destination enumeration processor 18$f$, and the data transmission processor 18$t$ is included in the above-described category. Meanwhile, the function that does not conform to such module interfaces is not included in the above-described category.

For example, a case where the image processing apparatus 100 executes copying processing is considered. In regard to a copying function, an output destination of the image data of the document is obvious. Even in the case where the image data of the document is temporarily stored in the image data storage 16, the user does not have to select such a storage destination. Thus, there is no need to execute the processing using the storage destination enumeration processor 18$f$. Meanwhile, in the example illustrated in FIG. 2, a processing module to print the image data is not provided. This is natural since it has been described to only focus on the transmission function with reference to FIG. 2 for simplicity. Thus, copying is the function that does not conform to the module interfaces illustrated in FIG. 2, and is not included in the category of the transmission function.

Types of the processors (the module interfaces) provided in the operation manager 18 and types of the modules corresponding thereto in FIG. 2 merely constitute one example and thus are not limited thereto.

In order to describe such an example, the printing function with which the cloud service A prints the image data stored in the cloud server 20 is herein considered. In such a case, the initialization processing, the authentication processing, and the destination enumeration processing are also used for the printing function. However, it will be readily understood that it is necessary to add a processing module that receives and prints the image data stored in the cloud server 20.

For this reason, as the module interfaces including the printing function, the five module interfaces for the initialization processing, the authentication processing, the storage destination enumeration processing, the data transmission processing, and printing processing are prepared. When executing the transmission function to the cloud server 20, the controller 11 only needs to transmit the image data to the cloud server 20 by using, of those five module interfaces, the module interfaces for the initialization processing, the authentication processing, the storage destination enumeration processing, and the data transmission processing. In the case where the printing function related to the cloud server 20 is executed, the image data that is stored in the cloud server 20 can be printed by using the module interfaces for the initialization processing, the authentication processing, the storage destination enumeration processing, and the printing processing.

Here, the description has been made so far on the configuration including the printing function in order to present the fact that the module interfaces illustrated in FIG. 2 merely constitute the one example. Hereinafter, the description will be continued again on the simple configuration with the transmission function illustrated in FIG. 2.

The initialization processor 18$i$ in the operation manager 18 calls the initialization processing module 21$i$. Then, the called initialization processing module 21$i$ executes the script that specifies the transmission processing procedure to the cloud server 20.

The authentication processor 18$o$ executes the authentication processing for the access to the cloud server 20 as the selected destination. More specifically, the authentication processor 18$o$ calls the authentication processing module 21$o$. The called authentication processing module 21$o$ executes the script that specifies the authentication processing procedure to the cloud server 20.

The storage destination enumeration processor 18f acquires information on a selected folder and a subfolder under the selected folder in the cloud server A. More specifically, the storage destination enumeration processor 18f calls the storage destination enumeration processing module 21f in the cloud server A transmission module 21. The called storage destination enumeration processing module 21f executes a script that specifies a procedure to acquire a folder structure of the cloud server 20.

Figure 3:
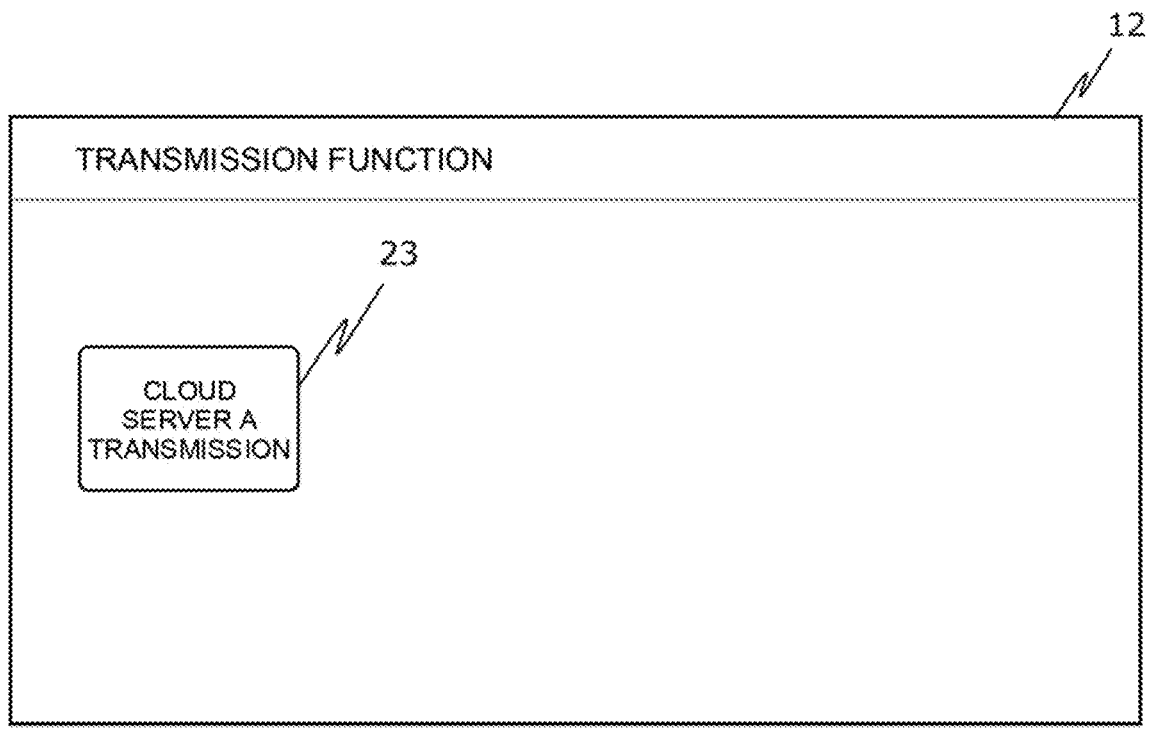
FIG. 3 is an explanatory view illustrating a state where a selectable candidate is shown on a display in the present embodiment.

FIG. 3 is an explanatory view illustrating, as an example, a state where a user-selectable candidate is shown on the display 12 in the present embodiment. In the present embodiment, a display content of a screen that is illustrated in FIG. 3, that is, at least an area where a cloud server A transmission key 23 is shown, is written in HTML. In the illustration of FIG. 3 that corresponds to FIG. 2, only the cloud server A transmission key 23 is shown as the user-selectable transmission candidate on the display 12. In the case where the cloud server A transmission key 23 is operated on the screen illustrated in FIG. 3, the controller 11 calls the operation manager 18. At that time, the controller 11 provides the operation manager 18 with a parameter that corresponds to the cloud server A transmission module 21. According to the provided parameter, the called operation manager 18 calls and executes the script related to the initialization processing module 21i that belongs to the cloud server A transmission module 21.

A description will hereinafter be made on a description example of a specific processing procedure of each of the processing modules constituting the controller 11, the operation manager 18, and the cloud server A transmission module 21 and each of the scripts corresponding thereto.

The example, which will be described below, is the description example of each of the processing procedures. However, those processing procedures merely constitute one example and do not limit the processing procedures. In addition, those processing procedures do not limit a description language.

First, a description will hereinafter be made on the processing procedure by the controller 11 that is related to the transmission function provided by the cloud service A.

[Formula 1]

```
// acquire processing for cloud service A
var behavior = mfp.get_function(id);         (24)
// initialize image processing method for cloud service A
var process = new ImageProcess(behavior);    (25)
// execute storage destination enumeration processing of cloud service
A process.authenticate( );                   (26)
// execute transmission destination enumeration processing under
top-level folder
var folders = process.folders("/");          (27)
// transmit data to designated folder
process.upload(folders[0]);                  (28)
```

The above example is an excerpt of the processing related to the present embodiment and does not illustrate all types of the processing. In detail, the above example illustrates processing of a case where the content related to the cloud service A is shown on the display 12 and an operation thereon is performed. The display related to the cloud service A is written in HTML. When the operation is performed for the display, all types of the processing executed by the controller 11, the operation manager 18, and the cloud server A transmission module 21 are written as HTML scripts. Another control program for control of the image processing apparatus 100 is stored, in the memory, as a native instruction sequence of the processor. However, it is assumed herein that a top-level folder of the cloud server 20 is a prescribed folder for uploading an image data file.

In the description in (24), the processor, as the controller 11, executes the method get_function( ) for the object mfp. The parameter id is an identifier of the transmission function that corresponds to the cloud server A transmission key 23 illustrated in FIG. 3. mfp.get_function(id) represents processing to acquire a value indicative of an entity of the processing module that corresponds to the selected transmission function in the variable behavior.

By changing the parameter id, the controller 11 realizes a mechanism to change behavior of the operation manager 18 according to the function to be executed. The processor, as the operation manager 18, identifies the passed-over parameter id, and calls and executes the corresponding processing module.

The description in (25) defines process as an instance of the ImageProcess object. As the parameter, entity behavior of the processing module, which is acquired in the above description in (24), is passed. That is, by executing the initialization, the operation manager 18 executes processing to set the transmission function (an image processing method to be executed) to process, which is an instance (an entity) of the object. A further description will be made on the content of the ImageProcess object in an implementation example of the cloud server A transmission module 21.

The description in (26) indicates execution of the authentication processing, process.authenticate( ), which is defined as a method for the instance process of the object related to the image processing method set in (25) above.

The description in (27) indicates execution of the storage destination enumeration processing, process.folders( ), which is defined as another method for the instance process of the object related to the image processing method set in (25) above. The method is executed by passing a parameter "/", which represents the top-level folder. As a result, the information on the top-level folder and the subfolder under the top-level folder of the cloud server 20 is obtained for array variable folders.

The description in (28) indicates execution of the data transmission processing, process.upload( ), which is defined as further another method for the instance process of the object related to the image processing method set in (25) above. The method is executed by passing a parameter "folders[0]", which represents the folder image data under the top-level folder of the cloud server 20. In this way, the image data is uploaded to the top-level folder of the cloud server 20.

Next, a description will hereinafter be made on a description example of the processing by the operation manager 18.

[Formula 2]

```
// ImageProcess class.
var ImageProcess = function (service) {      (29)
    var behavior = null;
    // set behavior to selected service
    this.behavior = service;
};
// delegate authentication processing to submodule for selected
service
ImageProcess.prototype.authenticate = function( ) {   (2a)
    return this.behavior.authenticate( );
};
// delegate storage destination enumeration processing to
submodule for selected service
ImageProcess.prototype.folders = function(folder) {   (2b)
```

[Formula 2]

```
        return this.behavior.folders(folder);
    };
    // delegate data transmission processing to submodule for
    selected service
    ImageProcess.prototype.upload = function(folder) {         (2c)
        this.behavior.upload(folder);
    };
```

The description in (29) indicates the initialization processing of the image processing method in the operation manager 18. The description in (29) sets the actual behavior of the image processing method to a variable behavior representing an entity of the processing module, which is acquired by the description in (24), mfp.get_function(id), described in the implementation example of the controller 11. The parameter used to execute the description in (25) described in the implementation example of the controller 11 is behavior. In (2a) to (2c), this.behavior indicates an entity of the transmission processing. Here, this written herein is a global object and, more specifically, depends on a caller of ImageProcess. However, in this example, this relates to the instance process of the object that is defined in (25) described in the implementation example of the controller 11.

The description in (2a) indicates execution of the authentication processing of the selected image processing method, that is, authenticate, which is defined as a method for the object ImageProcess. However, here, authenticate only calls and executes a method authenticate( ), which is defined for this.behavior indicating the entity of the processing module, and returns a return value thereof. The actual authentication processing is delegated to a method this.behavior.authenticate( ) for the processing module that is set in the description in (29).

The description in (2b) indicates execution of the storage destination enumeration processing of the selected image processing method, that is, folders, which is defined as a method for the object ImageProcess. However, here, folders only passes a parameter folder to the method folders( ) defined for this.behavior for calling and execution, and returns a return value thereof. The actual storage destination enumeration processing is delegated to a method this.behavior.folders( ) for the processing module that is set in the description in (29).

The description in (2c) indicates execution of the data transmission processing of the selected image processing method, that is, upload, which is defined as a method for the object ImageProcess. However, here, upload only passes a parameter folder the method upload( ) defined for this.behavior for calling and execution, and returns a return value thereof. The actual data transmission processing is delegated to a method this.behavior.upload( ) for the processing module that is set in the description in (29).

Furthermore, a description will hereinafter be made on a description example of the processing by each of the processing modules that constitute the cloud server A transmission module 21.

[Formula 3]

```
// CloudA class
// implement all interfaces of Framework
var id = "64458549-98AF-46C9-BDBB-5A653B62E524";    (2d)
```

[Formula 3]

```
var displayName = "transmit to cloud A server"
CloudA = function( ) {                                  (2e)
    // execute initialization processing
    this.id = id;
    this.displayName = displayName;
    mfp.register_function(this);
};
// execute authentication processing for cloud service A
CloudA.prototype.authentication = function(folder) {    (2f)
    // execute authentication processing and return result.
    (skip)
};
// execute storage destination enumeration processing for cloud
service A
CloudA.prototype.folders = function(folder) {           (2g)
    // execute storage destination enumeration processing and
    return result
    (skip)
};
// execute data transmission processing for cloud service A
CloudA.prototype.upload = function(folder) {            (2h)
    // execute data transmission processing
    (skip)
};
```

The description in (2d) indicates the application of a unique attribute value, which corresponds to the transmission function, to the cloud server 20. The attribute values are an identifier id and a display name displayName. The identifier id uniquely identifies the processing module. The processing module that is defined in this case is the cloud server A transmission module 21. The display name is used to show the selectable transmission function on the display 12. That is, the display name corresponds to the name of the cloud server A transmission key 23 illustrated in FIG. 3.

In the description of (2e), the attribute values (the identifier id and the display name displayName) of the processing module are called and set to the original global variables, and then the entity of the processing module to be adopted by the operation manager 18 of the image processing apparatus 100 is registered in mfp.register_function(this). This description corresponds to mfp.get_function( ) in the description of (24) described in the implementation example of the controller 11. With the entity registration in the description (2e), it is possible to acquire the entity of the processing module to be executed from the identifier id in mfp.get_function(id) in the description in (24).

The description in (2f) indicates specific processing of the authentication processing for the cloud server. Here, in (2f), the specific description of the authentication processing is redundant and thus is omitted and described as a type. The specific description depends on the module interface specification of the operation manager 18 and the service interface of the cloud server 20.

The description in (2g) indicates specific processing of the storage destination enumeration processing for the cloud server. Here, in (2g), the specific description of the storage destination enumeration processing is redundant and thus is omitted and described as a type. The specific description depends on the module interface specification of the operation manager 18 and the service interface of the cloud server 20.

The description in (2h) indicates specific processing of the data transmission processing for the cloud server. Here, in (2h), the specific description of the data transmission processing is redundant and thus is omitted and described as a type. The specific description depends on the module interface specification of the operation manager 18 and the service interface of the cloud server 20.

As it has been described so far, the processing procedure of the controller 11 and the operation manager 18 for the module interface depends on the type of the processing to be executed (the initialization processing, the authentication processing, the storage destination enumeration processing, or the data transmission processing). However, the processing module does not depend on the processing that is actually executed by the processing module. The processing to be actually executed is described in the processing module that is called by the operation manager 18. Thus, even in the case where the transmission function is added, deleted, or changed later, there is no need to change the processing procedure executed by the controller 11 or the operation manager 18 as long as the type of processing is not changed. In addition, it is also unnecessary to build virtual environment as disclosed in Japanese Patent Application Publication No. 2009-37627.

Flowcharts

A description will hereinafter be made by the processing by the controller 11, the operation manager 18, and the processing module related to the transmission function with reference to flowcharts.

Figure 4A:
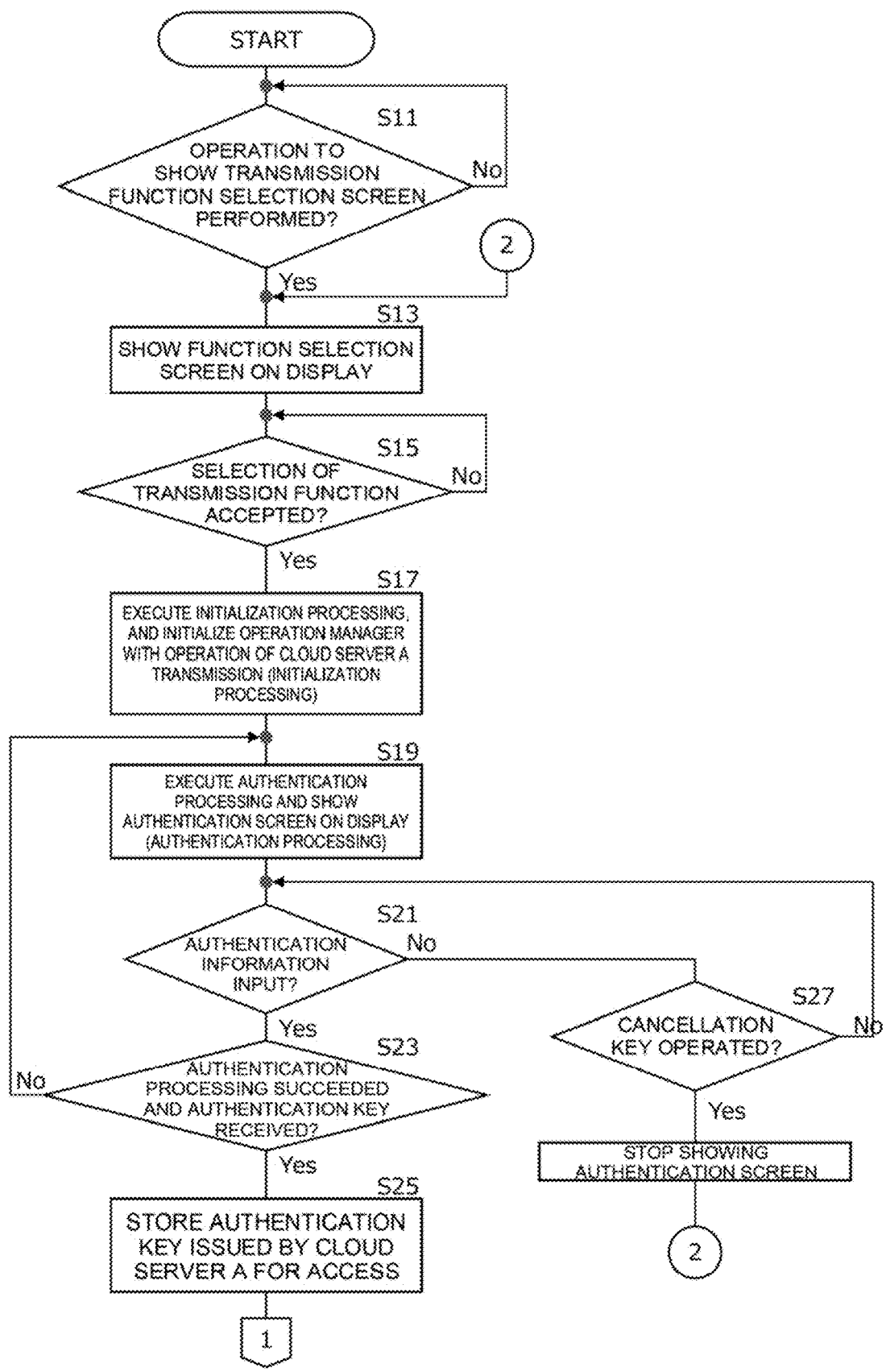
FIG. 4A is a first flowchart illustrating an example of processing that is executed by a processor as a controller, an operation manager, and a processing module in regard to a transmission function in the present embodiment.
Figure 4B:
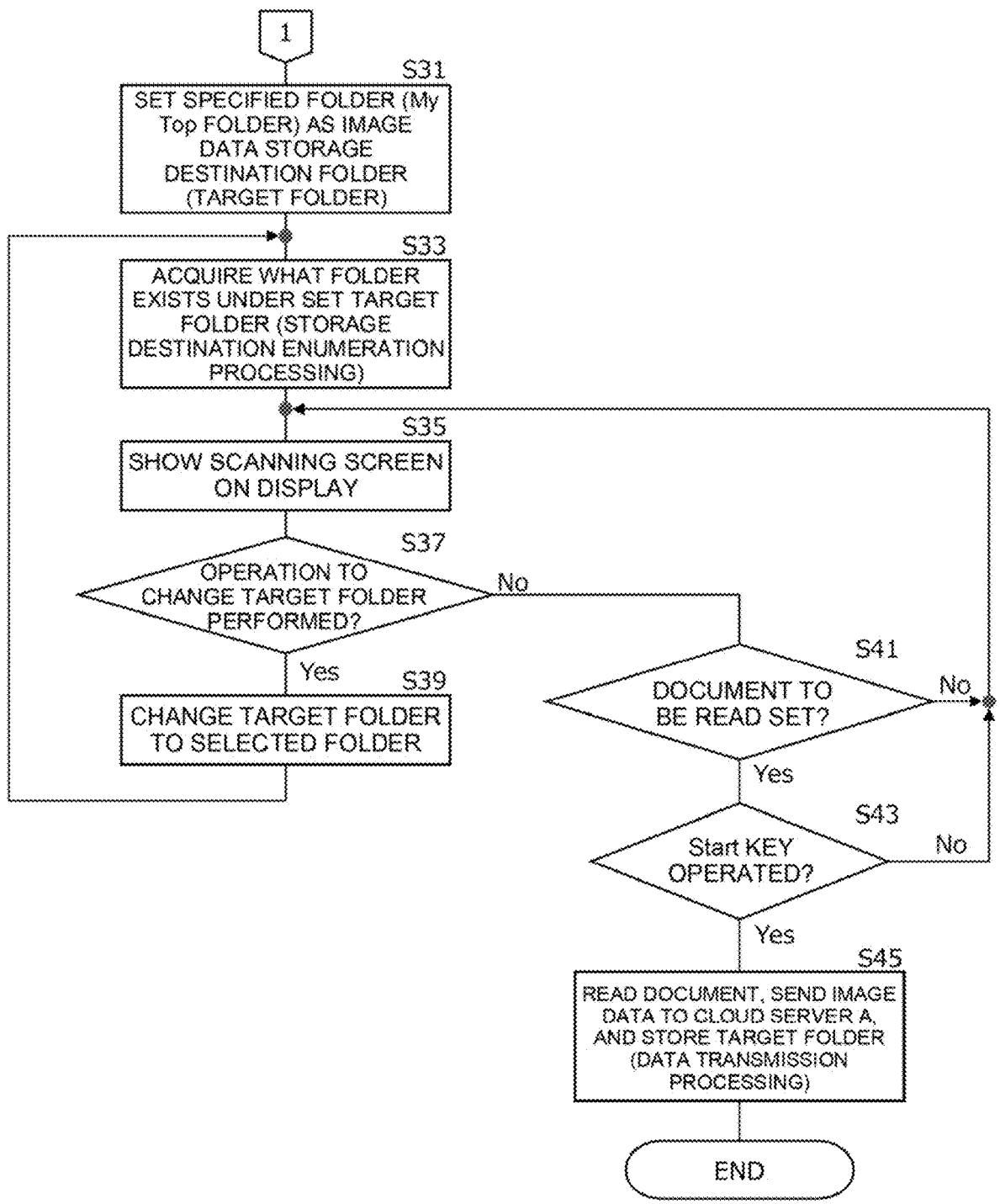
FIG. 4B is a second flowchart illustrating the example of the processing that is executed by the processor as the controller, the operation manager, and the processing module in regard to the transmission function in the present embodiment.

FIG. 4A and FIG. 4B each illustrate a flowchart illustrating an example of the processing that is executed by the processor as the controller 11, the operation manager 18, and the processing module in regard to the transmission function in the present embodiment.

FIG. 4A and FIG. 4B each illustrate an example of the procedure in which the user operates the image processing apparatus 100 to select the folder in the cloud server 20 as the transmission destination of the image data and then transmits the image data to the selected folder to create a file.

As illustrated in FIG. 4A, if the operation is performed via the input device 10 to show the screen for selecting the transmission function (see FIG. 3) on the display 12 (Yes in step S11), the processor shows the screen for selecting the transmission function on the display and waits for the user to select the transmission function (step S15). The screen for selecting the transmission function is the screen illustrated in FIG. 3, and the only option is CLOUD SERVER A TRANSMISSION.

If the cloud server A transmit key 23 is operated (Yes in step S15), the processor initializes the operation of the selected function (step S17). That is, in response to the operation (the selection) of the cloud server A transmission key 23, the processor as the controller 11 calls the initialization processor 18*i* in the operation manager 18 to execute the initialization processing. By executing the initialization processing, the subsequent processing is executed as the processing for the transmission function to the cloud server 20.

Figure 5:
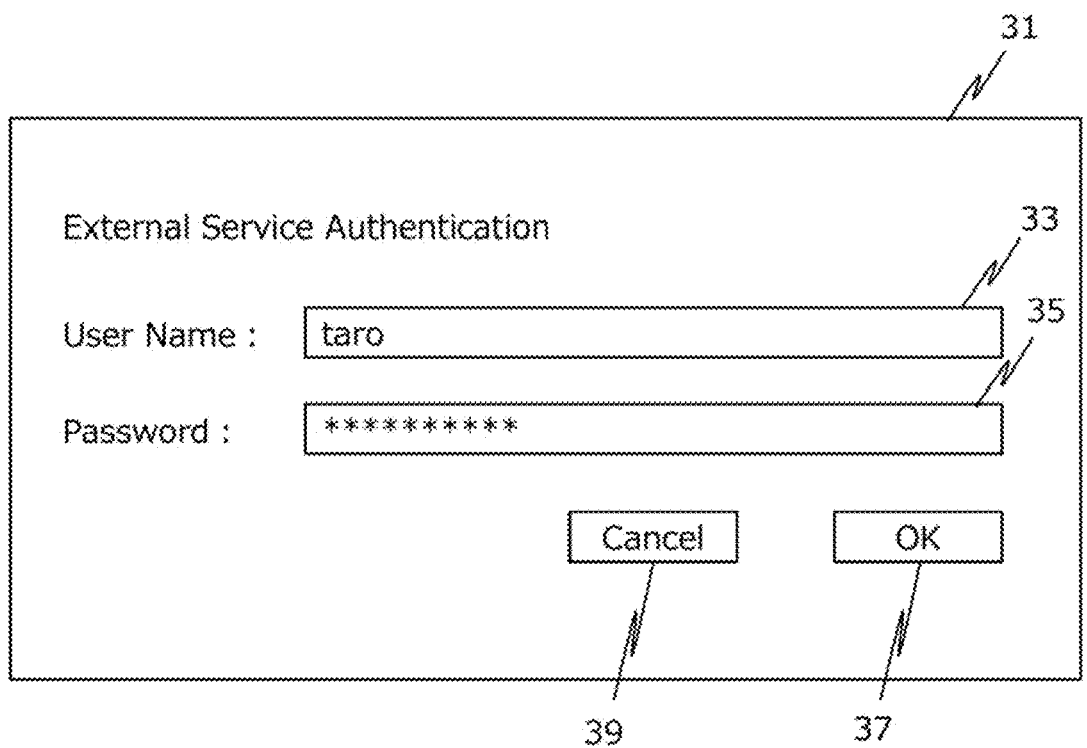
FIG. 5 is an explanatory view illustrating an example of user authentication for cloud server A transmission.

Next, the processor calls the authentication processor 18*o* in the operation manager 18 as the controller 11 and executes the authentication processing for the cloud server 20 (step S19). By executing the authentication processing, the processor as the authentication processing module 21*o* shows, on the display 12, an authentication screen used to perform user authentication for the cloud server 20. FIG. 5 is an explanatory view illustrating an example of the user authentication for the cloud server 20. As illustrated in FIG. 5, an input field 33 for a user name (User Name) and an input field 35 for a password (Password) are arranged on an authentication screen 31. In addition, an OK key 37 and a CANCEL key 39 are also arranged thereon.

When the OK key 37 is operated (Yes in step S21) in a state where the user inputs the user name and the password requested to be input in the input fields 33, 35, the processor as the authentication processing module 21*o* transmits the input user name and password to the cloud server 20. However, the authentication screen 31 illustrated in FIG. 5 is merely one example, and authentication information requested to be input is not limited to the user name and the password. For example, in the case where the service interface for the cloud server 20 requests the input of a one-time password, on the authentication screen 31, an input field of the one-time password is arranged instead of the input fields 33, 35 of the user name and the password.

The authentication processing of the cloud server 20 is executed by using the transmitted authentication information. If the authentication processing is successful, an authentication key is transmitted from the cloud server 20 (Step S23).

If the authentication key is received from the cloud server 20 as a proof of the successful authentication processing (Yes in step S23), the processor as the authentication processing module 21*o* stores the received authentication key in a specified location in the image data storage 16 for use in subsequent accesses to the cloud server 20 (Step S25). The stored authentication key is valid until the user logs out from the cloud server 20.

On the other hand, if the authentication processing of the cloud server 20 fails and an error is received (step S23), the processing returns to above-described step S19, and the processor as the authentication processing module 21*o* shows, on the display 12, the authentication screen 31 again with a message that the authentication has failed, and requests the input of the authentication information.

If the CANCEL key 39 is operated on the authentication screen 31 (step S27), the authentication screen 31 is no longer shown (step S29). Then, the processing returns to step S13, and the processor shows the function selection screen on the display 12.

In the case where the authentication processing for the operation of the user authentication succeeds and the authentication key is stored, the processor as the controller 11 then sets the specified top-level folder (My Top folder) as the selection target folder (a target folder) of the cloud server 20 (step S31 in FIG. 4B). Then, the storage destination enumeration processor 18*f* in the operation manager 18 is called, and the storage destination enumeration processing is executed to acquire the information on the folder that exists under the target folder of the cloud server 20 (step 33).

The processor as the storage destination enumeration processing module 21*f* shows, on the display 12, a scan screen on which an operation related to document scanning is accepted.

Figure 6:
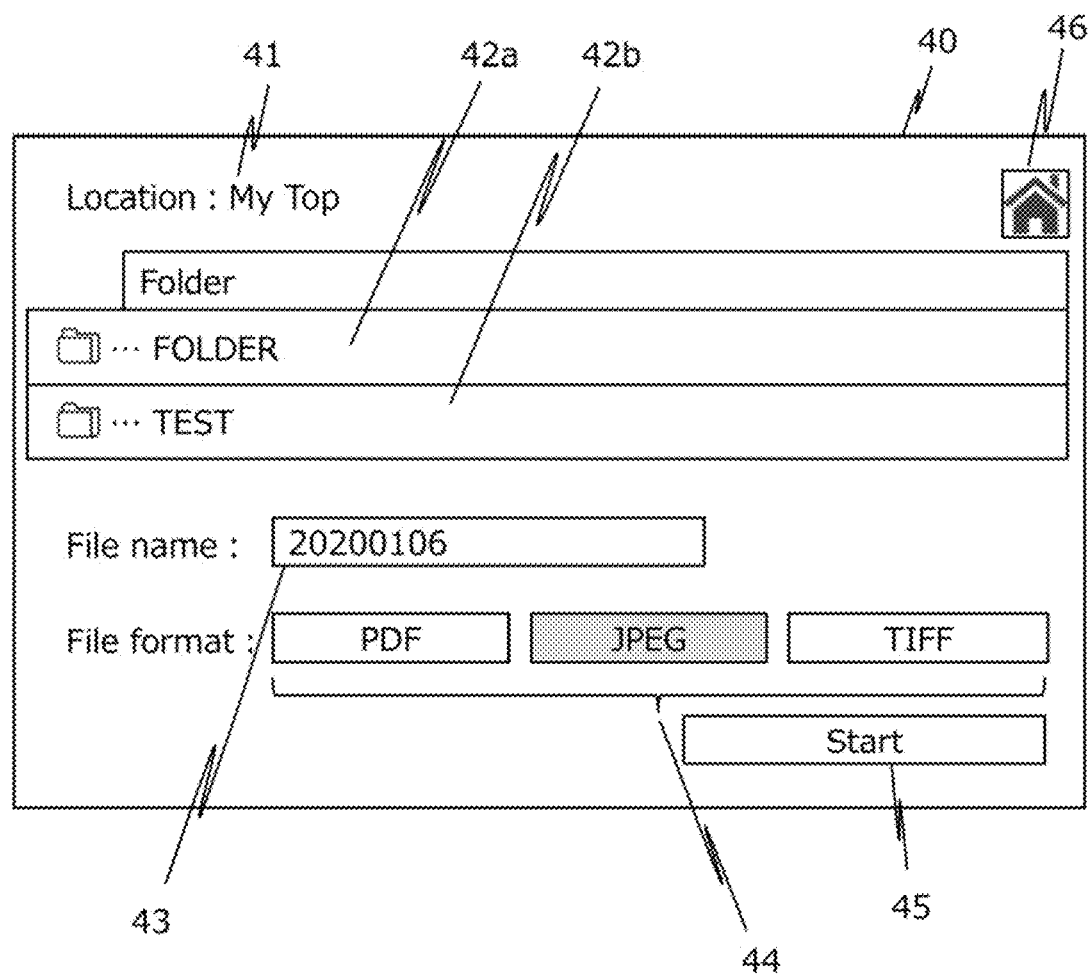
FIG. 6 is an explanatory view illustrating an example of a scan screen in the present embodiment.

FIG. 6 is an explanatory view illustrating an example of the scan screen in the present embodiment. In a scan screen 40 illustrated indication FIG. 6, the topmost section is a target folder section 41 that shows a currently selected folder (the topmost My Top folder). Fields under the target folder section 41 are subdirectory folder columns 42*a*, 42*b*, that show the subfolders (FOLDER and TEST) under the target folder. The number of the subdirectory folder columns is changed according to the number of the subfolders.

Under the subdirectory folder columns 42*a*, 42*b*, a file name field 43 shows a file name of the image data to be stored in the target folder. Further under the file name field, a file format selection key 44 is shown to select a file format of the image data to be stored. In the example illustrated in FIG. 6, one of three file formats of PDF, JPEG, and TIFF can be selected, and a state where JPEG is selected is illustrated.

A Start key 45, which instructs a start of scanning, is arranged at the bottom of the scan screen 40. By clicking any of the subdirectory folder columns 42a, 42b, the user can move from the target folder to the clicked subdirectory folder. When the user move to the subdirectory folder, such a folder becomes the target folder, and the subfolder further under the subdirectory folder is shown in the subdirectory folder column. In addition, a parent folder column, which is not illustrated in FIG. 6, is also shown. By clicking the subdirectory folder column or the parent folder column, the user can move to the clicked subdirectory folder as desired. In this way, the user can move freely between the folders.

To return to the topmost folder (My Top folder), the user may click the parent folder column for the required number of times. However, by clicking a home key 46 at an upper right corner of the scan screen 40, the user can move to the topmost folder at once.

Now, the description on the flowcharts is continued.

When the user clicks any of the subdirectory folder columns 42a, 42b in the state where the scan screen 40 is shown in above-described step S35, the following processing is executed in response to the click operation. That is, the processor as the controller 11 changes the target folder to the selected folder (step S39), and the processing returns step S33. Then, the processor as the controller 11 executes the storage destination enumeration processing to acquire the information on the subdirectory folder of the newly selected target folder. That is, the processor as the controller 11 calls the storage destination enumeration processor 18f in the operation manager 18, and the called storage destination enumeration processor 18f calls the storage destination enumeration processing module 21f. In this way, the display of the target folder section 41 and the subdirectory folder columns on the scan screen 40 is updated.

Although not illustrated in FIG. 4B, in the case where the file name field 43 and the file format selection key 44 are operated on the scan screen 40, the processor as the controller 11 makes settings in response thereto.

Furthermore, the processor as the controller 11 waits for the document to be set in the image reader 13 (step S41), and waits for the Start key 45 on the scan screen 40 to be operated (step S43).

If the document is not set, or if the Start key 45 is not operated, the processing returns to above-described step S35, and the processor monitors the operation on the scan screen 40.

If the Start key 45 is operated, in response to such an operation, the processor as the controller 11 calls the data transmission processor 18t of the operation manager 18. The called data transmission processor 18t calls the data transmission processing module 21t.

The data transmission processing module 21t reads the document and generates the image data. The file format is the format that is set on the scan screen 40. Then, the interface for data upload, which is provided by the cloud server 20, is accessed by using the authentication key, and the generated image data is uploaded. An upload destination and the file name are the target folder selected on the scan screen 40 and the file name set on the scan screen 40.

Addition, Deletion, and Change of Function Management

As illustrated in FIG. 1 and FIG. 2, according to the present embodiment, the operation manager 18 is interposed between the controller 11 and the processing module that defines the specific processing procedure. In this way, in the case where the function is added, deleted, or changed later, an influence thereof is limited to the processing module, which is added, deleted, or changed, and thus the other functions of the controller 11 are not influenced.

A description will hereinafter be made on a specific example of the addition, the deletion, and the change of the function.

First Embodiment

First, a description will be made on an example in which the function is added later.

FIG. 7A to FIG. 7D are explanatory views illustrating an operation procedure in the case where the transmission function is added to an FTP server (not illustrated in FIG. 1) that is connected via the network 19 in a state where the image processing apparatus 100 already has the cloud service (the transmission function) related to the cloud server 20 as illustrated in FIG. 1 to FIG. 3.

In the present embodiment, a function management screen is used to add, delete, or change the function of the image processing apparatus 100. The processor of the image processing apparatus 100 provides the function management screen written in HTML in response to a specified operation accepted by the input device 10 or a request from the external equipment via the network 19. Thus, the function management screen can be shown on the display 12 by using a web browser, and the function management screen can accept the operation by the user or can accept the operation by the user by showing the function management screen on the external equipment that is connected via the network 19.

Figure 7A:
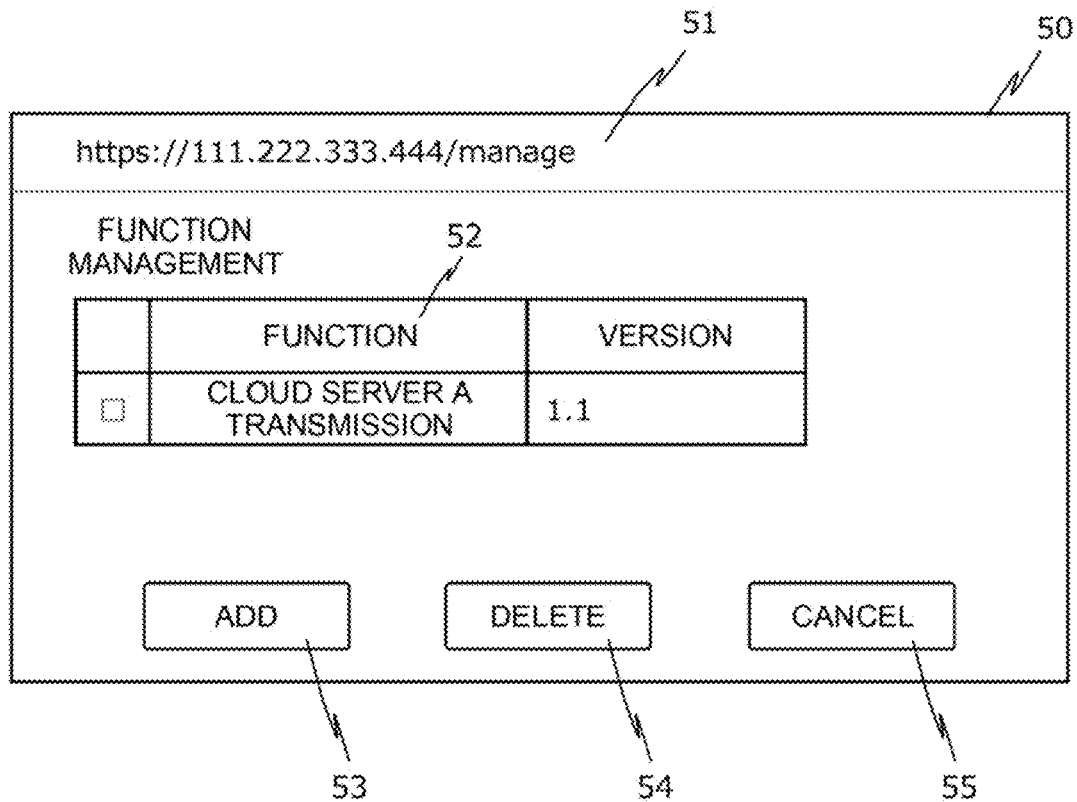
FIG. 7A is a first explanatory view illustrating an operation procedure for adding the transmission function in the present embodiment.

FIG. 7A illustrates a display example of the function management screen. As illustrated in FIG. 7A, a URL display section 51 is arranged at the top of a function management screen 50. A function display table 52 is arranged under the URL display section 51, and a list of the available functions is shown. The function display table 52 includes a check field at a left end, a function field on a right side thereof, and a version field further on the right side. Currently, the only available function is the cloud server transmission function of version 1.1. An ADD key 53, a DELETE key 54, and a CANCEL key 55 are arranged under the function display table 52.

Figure 7B:
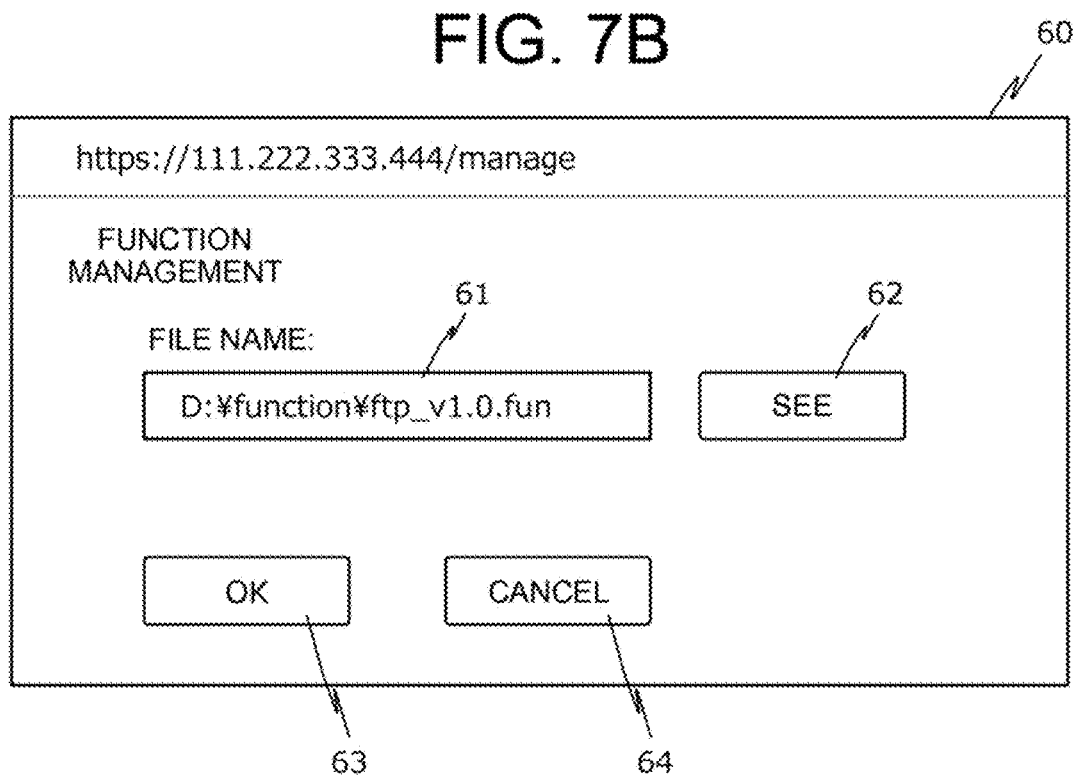
FIG. 7B is a second explanatory view illustrating the operation procedure for adding the transmission function in the present embodiment.

When the ADD key 53 is operated, in response thereto, the processor shows a function management screen 60 for selecting a function file illustrated in FIG. 7B instead of the function management screen 50 illustrated in FIG. 7A. When the DELETE key 54 is operated, in response thereto, the processor shows a function management screen for deleting the function. The deletion of the function will be described below. When the CANCEL key 55 is operated, in response thereto, the processor closes the function management screen 50.

FIG. 7B illustrates the function management screen 60 for selecting the function file. As illustrated in FIG. 7B, a file name display field 61 and a SEE key 62 for additional functions are arranged on the function management screen 60. An OK key 63 and a CANCEL key 64 are arranged under the file name display field 61 and the SEE key 62.

The file name display field 61 is initially blank. When the SEE key 62 is operated, the processor shows a file selection dialog, which is not illustrated in FIG. 7B, to allow the user to select the location of the file (the function file) of the additional function. When the location of the functional file is selected in the selection dialog, the processor shows the location and the file name of the selected functional file in the file name display field 61. When the OK key 63 is operated in such a state, the processor shows a confirmation screen 65 illustrated in FIG. 7C. In addition, when the CANCEL key 64 is operated, the processor shows the function management screen 50, which is illustrated in FIG. 7A, again.

Figure 7C:
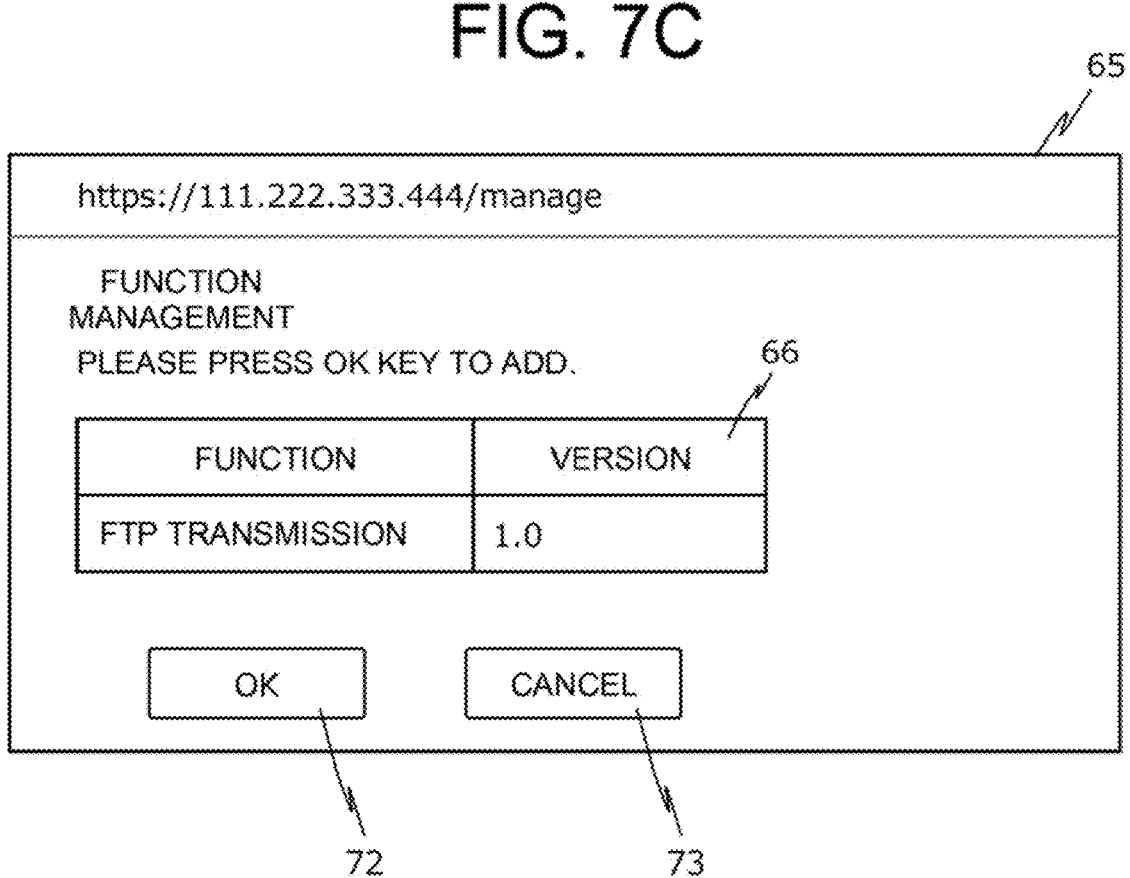
FIG. 7C is a third explanatory view illustrating the operation procedure for adding the transmission function in the present embodiment.

FIG. 7C illustrates the confirmation screen for adding the function. As illustrated in FIG. 7C, on the confirmation screen 65 for adding the function, an additional function display table 66 is arranged to show the function to be added, and an OK key 72 and a CANCEL key 73 are arranged under the additional function display table 66. When the OK key 72 is operated, the processor adds the function that is shown in the additional function display table 66 and shows the function management screen after the addition of the function illustrated in FIG. 7D. When the Cancel key 73 is operated, the current function management screen (see FIG. 7A), on which the function is not added, is shown.

Figure 7D:
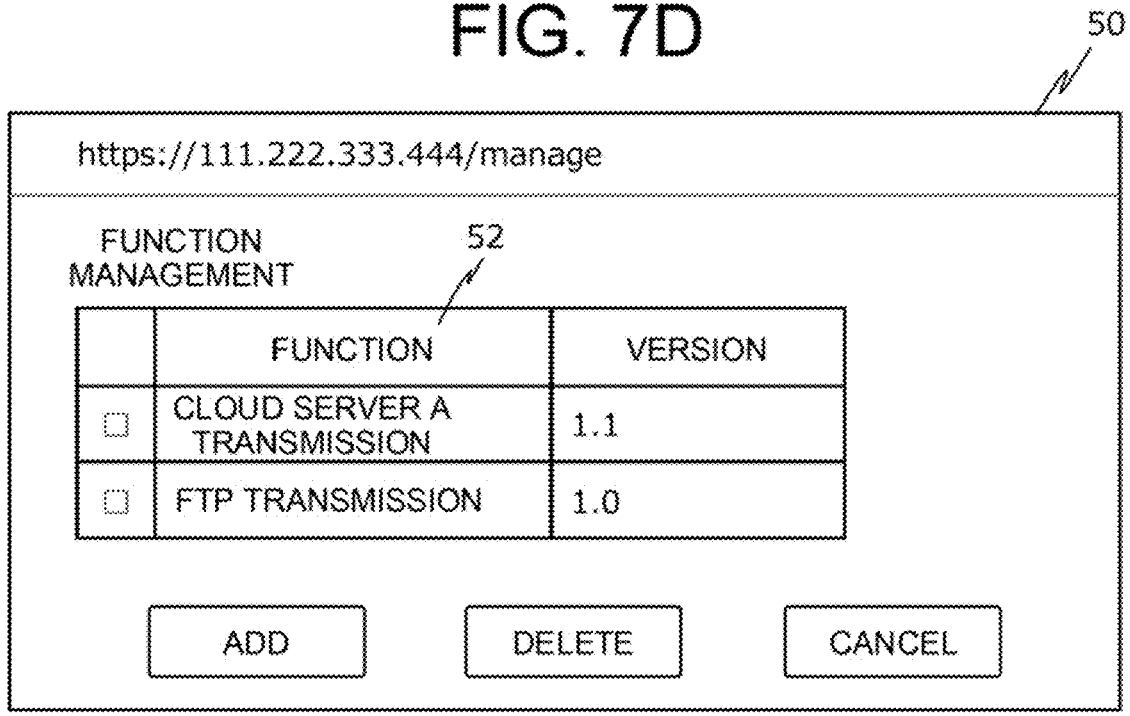
FIG. 7D is a fourth explanatory view illustrating the operation procedure for adding the transmission function in the present embodiment.

FIG. 7D illustrates the function management screen 50 in a state after the function is added. When compared to the function management screen 50 in the state prior to the addition of the function illustrated in FIG. 7A, the selected FTP transmission function (version 1.0) is added to the function display table 52.

What have been described so far is the operation procedure for adding the function.

FIG. 8 is an explanatory view that corresponds to FIG. 2 before the addition of the function and illustrates the processing modules after the addition of the function. As illustrated in FIG. 8, an FTP transmission module 22 is added to FIG. 8 in comparison with FIG. 2. The FTP transmission module 22 includes processing modules that are a storage destination enumeration processing module 22$f$, an initialization processing module 22$i$, an authentication processing module 22$o$, and a data transmission processing module 22$t$.

Figure 9:
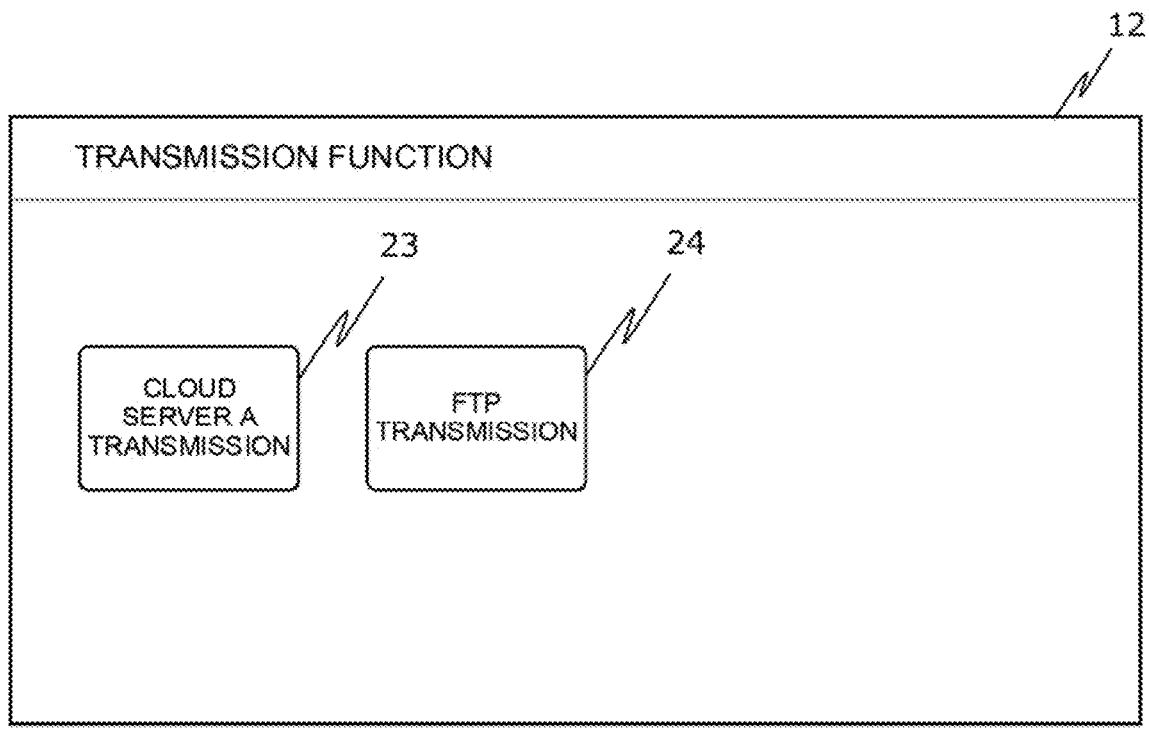
FIG. 9 is an explanatory view illustrating a state where the selectable candidates are shown on the display after the addition of the function in the present embodiment.

FIG. 9 is an explanatory view that corresponds to FIG. 3 before the addition of the function and illustrates a state where the selectable candidates are displayed on the display. As illustrated in FIG. 9, in addition to the cloud server A transmission key 23 illustrated in FIG. 3, the FTP transmission key 24 is shown as a transmission function option.

Second Embodiment

Next, a description will be made on an example in which the function is deleted.

Figure 10A:
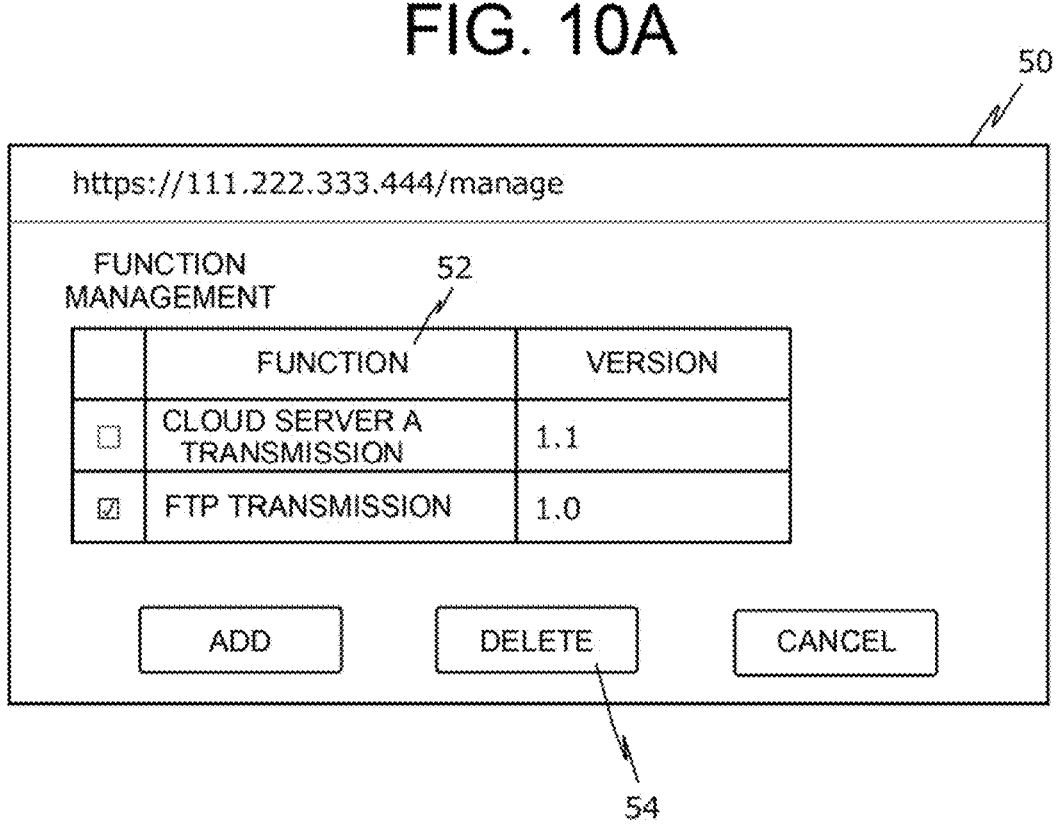
FIG. 10A is a first explanatory view illustrating an operation procedure for deleting the transmission function in the present embodiment.
Figure 10B:
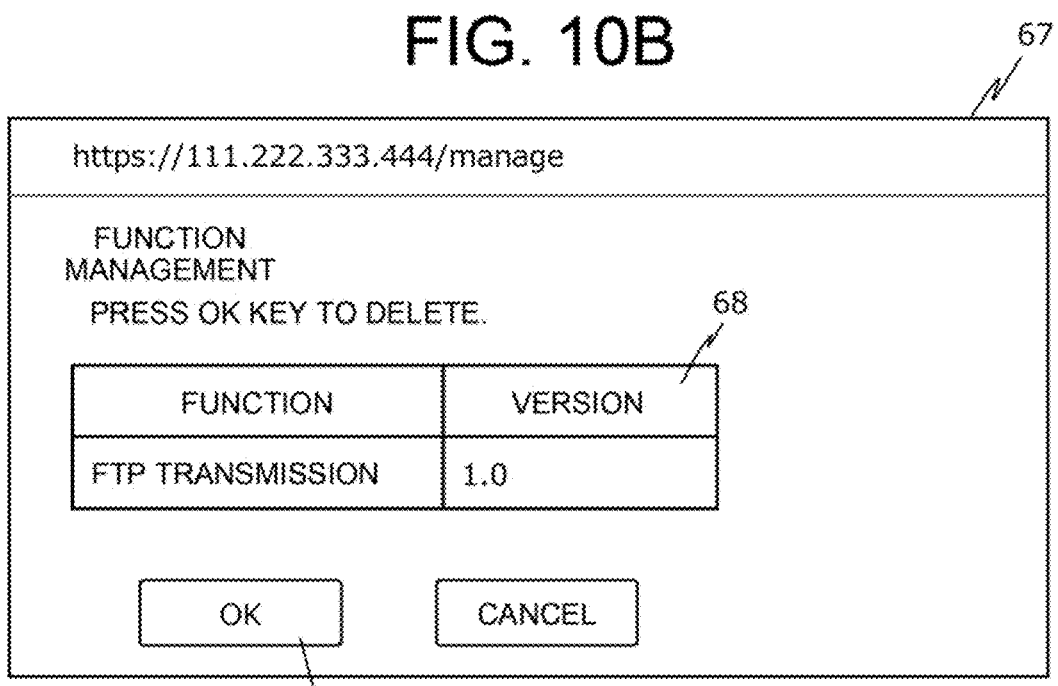
FIG. 10B is a second explanatory view illustrating the operation procedure for deleting the transmission function in the present embodiment.

FIG. 10A to FIG. 10C are explanatory views illustrating an operation procedure in the case where the FTP transmission function is deleted from a state where, as illustrated in FIG. 7D, FIG. 8, and FIG. 9, the image processing apparatus 100 already has the cloud service (the transmission function) related to the cloud server 20 and the FTP transmission function to the FTP server.

FIG. 10A illustrates the function management screen 50 that corresponds to FIG. 7D, but differs from the function management screen 50 in FIG. 7D in a point that FTP transmission in the function display table is ticked. When the DELETE key 54 is operated in the state where FTP transmission is selected, the processor shows a confirmation screen 67 for deleting the function illustrated in FIG. 10B instead of the function management screen 50 illustrated in FIG. 10A. The confirmation screen 67 for deleting the function corresponds to the confirmation screen 65 for adding the function illustrated in FIG. 7C, and a delete function display table 68 that corresponds to the additional function display table 66 in FIG. 7C.

When the OK key 69 is operated, the processor deletes the function shown in the delete function display table 68 and shows the function management screen after the deletion of the function illustrated in FIG. 10C. The function management screen 50 after the deletion of the function illustrated in FIG. 10C corresponds to that in FIG. 7A.

What have been described so far is the operation procedure for deleting the function.

Figure 11:
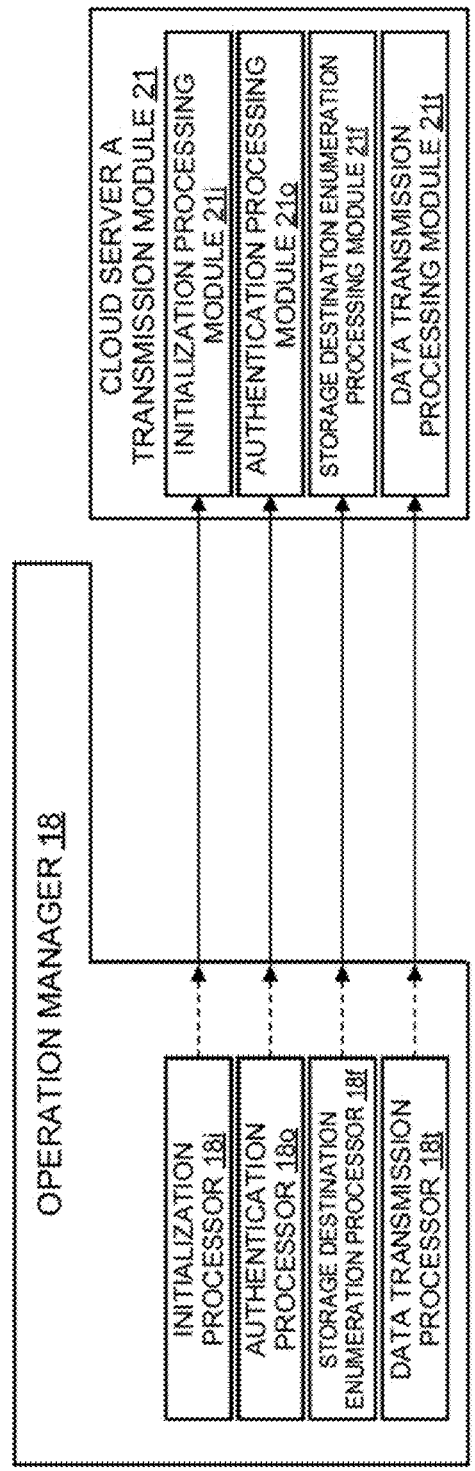
FIG. 11 is an explanatory diagram illustrating the processing modules after deletion of the function.

FIG. 11 is an explanatory diagram illustrating the processing modules after the deletion of the function. The FTP transmission module 22 is deleted from FIG. 8 that corresponds to the state before the deletion of the function. As a result, FIG. 11 corresponds to FIG. 2.

Figure 12:
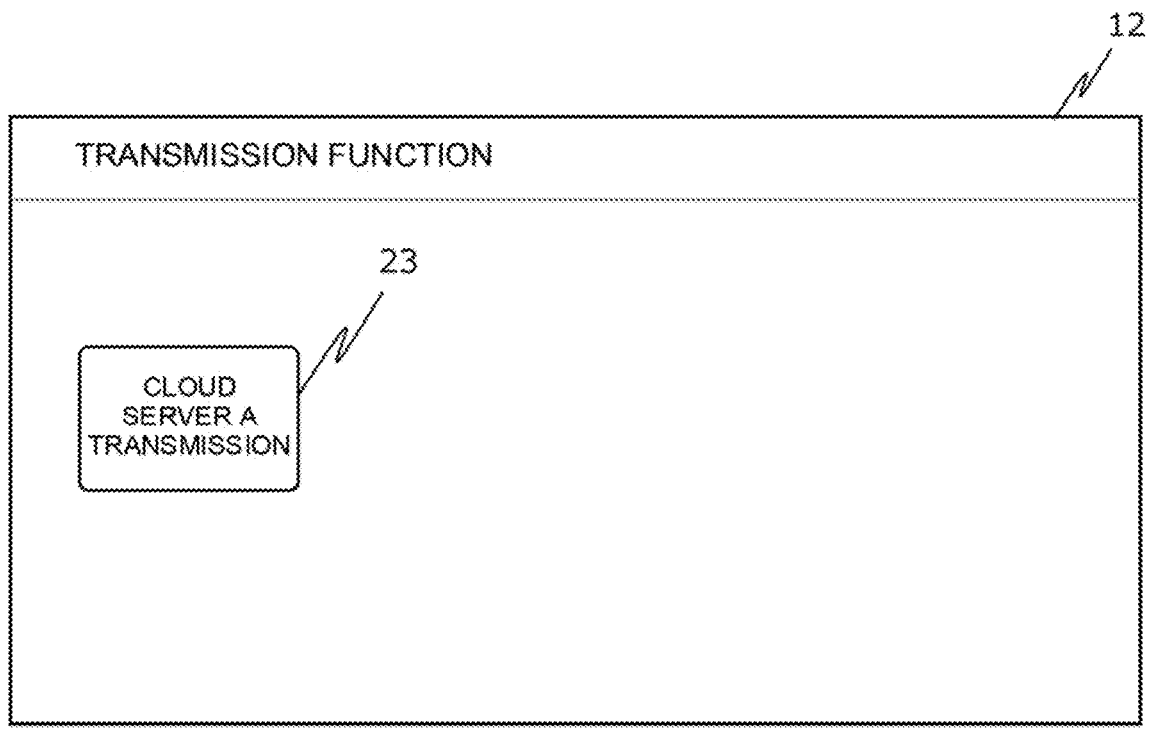
FIG. 12 is an explanatory view illustrating a state where the selectable candidate is shown on the display after the deletion of the function in the present embodiment.

FIG. 12 is an explanatory view illustrating a state where the selectable candidate is shown on the display after the deletion of the function. As illustrated in FIG. 12, the FTP transmission key shown before the deletion of the function is deleted, and only the cloud server A transmission key 23 is shown. As a result, FIG. 12 corresponds to FIG. 3.

Third Embodiment

Next, a description will be made on an example in which the function is updated (changed).

Figure 13A:
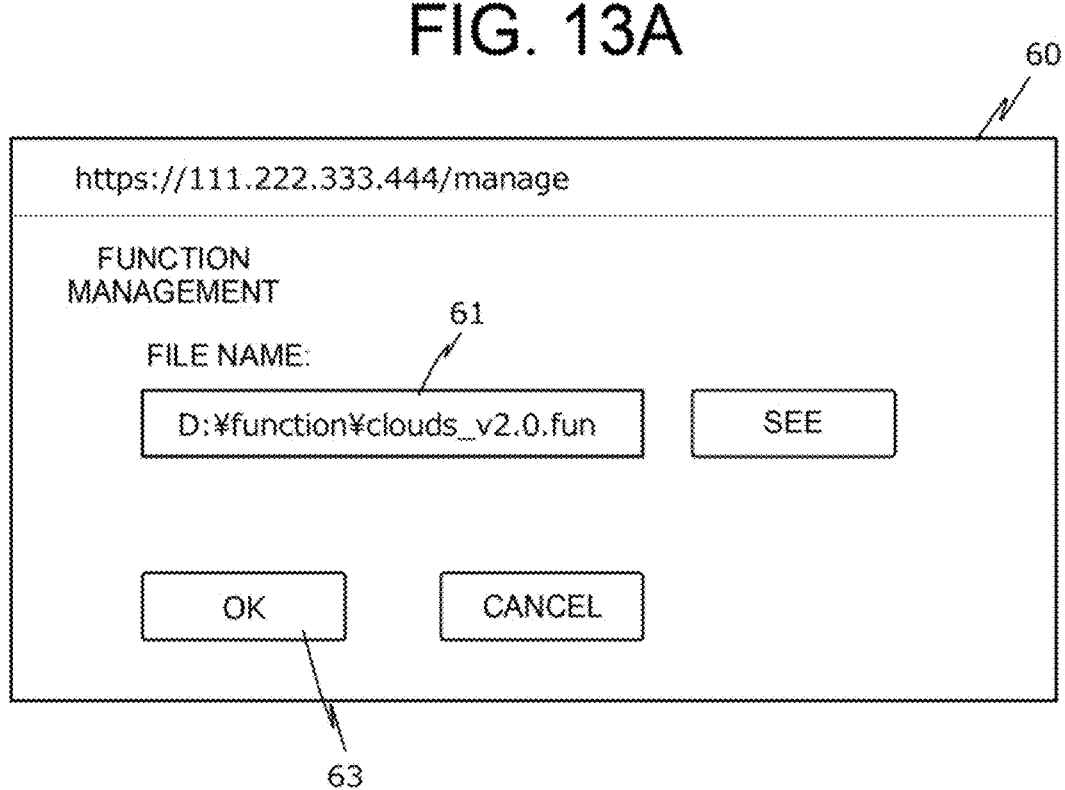
FIG. 13A is a first explanatory view illustrating an operation procedure for updating the transmission function in the present embodiment.
Figure 13B:
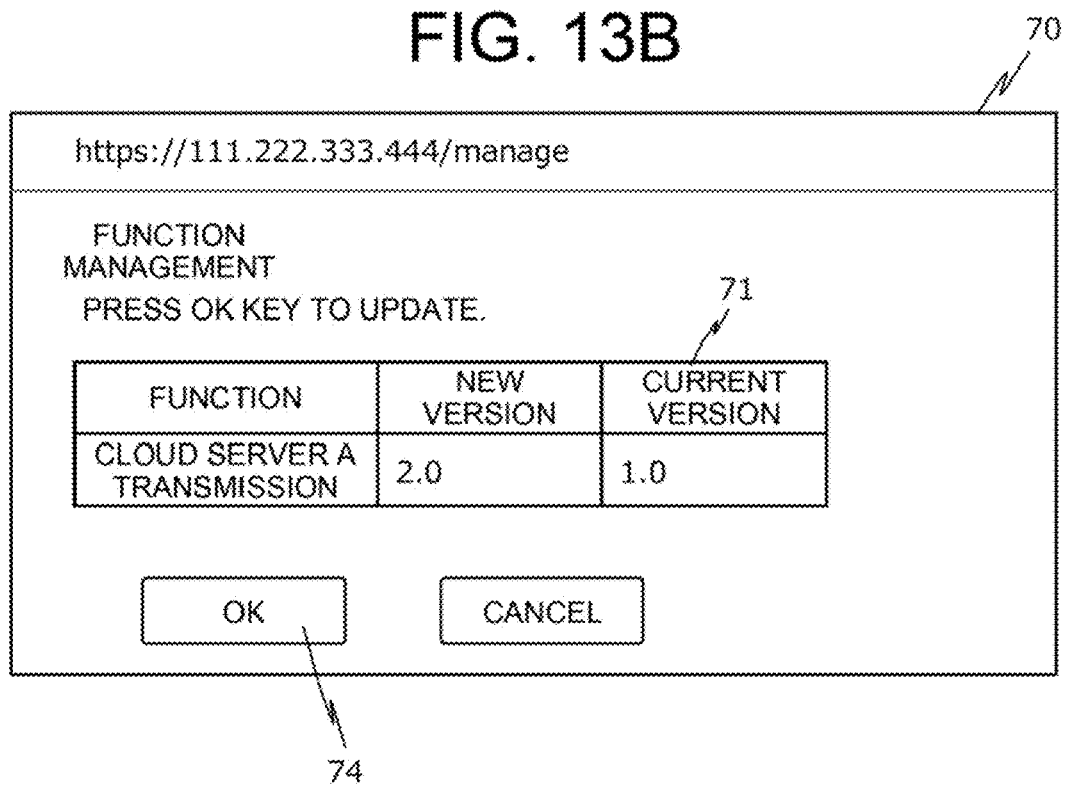
FIG. 13B is a second explanatory view illustrating the operation procedure for updating the transmission function in the present embodiment.
Figure 13C:
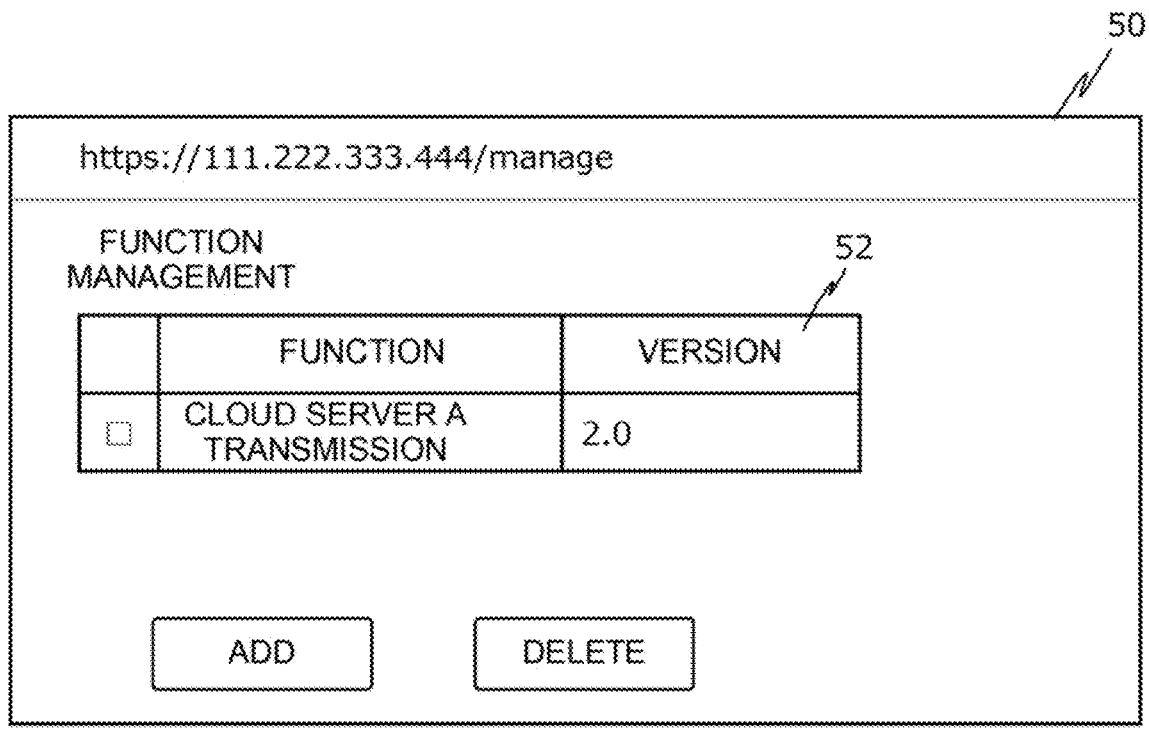
FIG. 13C is a third explanatory view illustrating the operation procedure for updating the transmission function in the present embodiment.

FIG. 13A to FIG. 13C are explanatory views illustrating an operation procedure in the case where, from a state where the image processing apparatus 100 already has the cloud service (the transmission function) related to the cloud server 20, version thereof is updated.

When the ADD key 53 is operated on the function management screen 50 illustrated in FIG. 7A, the processor switches the function management screen 50 to the function management screen 60 for selecting the function file as illustrated in FIG. 7B. Here, FIG. 13A is shown as corresponding to FIG. 7B.

In FIG. 13A, the content of the file name display field differs from that in FIG. 7B. In FIG. 13A, a new version of the function file of the already existing cloud server A transmission function is selected.

When the OK key 63 is operated in such a state, the processor shows a confirmation screen 70 illustrated in FIG. 13B.

FIG. 13B illustrates the confirmation screen for updating the function. As illustrated in FIG. 13B, on the confirmation screen 70 for the update of the function, an updated function display table 71 is arranged to show the function to be updated. The updated function display table shows the function to be updated, the current version thereof, and the version thereof after the update. When the OK key 74 is operated, the processor updates the function that is shown in the updated function display table 71. Then, the processor shows the function management screen after the update of the function illustrated in FIG. 13C.

FIG. 13C illustrates the function management screen 50 in the state after the function is added. When compared with the function management screen 50 in the state before the update of the function illustrated in FIG. 7A, the version of the cloud server A transmission is updated from 1.0 to 2.0. What have been described so far is the operation procedure for updating the function.

As it has been described so far, (i) the image processing apparatus according to the present invention includes: the processor that executes the script and the native instruction sequence related to the image processing; the controller that instructs the user to execute the selected image processing function; the operation manager that manages progress of the plural procedures constituting the image processing function when receiving the instruction from the controller, and the processing module that executes the processing according to each of the procedures of the image processing functions. The controller assigns the identifier, which corresponds to the image processing function, to each of the image processing functions and provides the common instruction to the image processing. The operation manager calls and executes the processing module that corresponds to the assigned identifier via the calling processing that is common to the image processing functions.

In the present invention, the native instruction sequence is a set of the instructions that the processor can analyzes and executes the instruction sequence. Normally, the native instruction sequence is generated by compiling instruction sequences that are written in a programming language such as C or Java that is easily understood by a human as a programmer. The program written in the native instruction sequences is then stored in the memory and executed by the processor. On the contrary, the script is the program written in a scripting language that can be understood by the human and stored in the memory. At the same time, processing of converting the scripting language into the native instruction sequences is also stored in the memory. JavaScript in the above-described embodiment is one of the scripting languages. When executing the script, the processor executes the script, which is stored in the memory, while converting the script into the native instruction sequence. In general, the scripting language has more functional limitations than the programming language. Instead, a runtime processing load is lighter than that in virtual environment where the script, which is generated by using the normal programming language, is executed via an interpreter. An example of the scripting language that is widely known is JavaScript executed in the web browser. The other examples are PHP, which is executed on the web server, and Perl, which is executed in diverse environment.

The image data is the data that the image processing apparatus sets as the image processing target regardless of the data format.

Furthermore, the image processing function is a type of the image processing that is executed by the image processing apparatus. For example, a specific aspect of the image processing function is a function of transmitting document data to transmit and store the image data of the document read by the image reader in the external equipment. Another example if the printing function to print the image data that is stored in the external equipment. The transmission function in the above-described embodiment corresponds to the above-described transmission function of the image data.

The object means that the processing module is written in object-oriented programming for encapsulating the processing and that processing of the object is defined as the method. For example, a specific aspect of the object is the processing module that is written in JavaScript in the above-described embodiment. By calling the operation manager, the controller specifies and executes the instance of the object that corresponds to the image processing function selected by the user. Each of the processors in the operation manager calls the processing module that corresponds to the identifier assigned by the controller, and executes the method that is defined for the specified instance.

Furthermore, a description will be made on preferred aspects of the present invention.

(ii) The image processing apparatus may further include: the display that shows the user-selectable image processing function to the user; and the input device that accepts selection of the image processing function by the user. The processing module may provide the option of the image processing function to be shown on the display, the input device may accept the selection by the user of the option that is shown on the display, and the controller may determine whether to provide the instruction to the operation manager according to the selected image processing function, and may determine the identifier to be assigned when providing the instruction.

In this way, it is possible to only show, as the option, the executable image processing function on the display and to accept the selection by the user.

(iii) The processing module may be the script that is written as the processing of the operation that is performed for the display of the image processing function, the display of the image processing function may be written in HTML, and the processing module may be the script in HTML.

In this way, it is possible to write the processing module as the script for the display screen related to the image processing function.

(iv) The operation manager may call the processing module in which the processing that is executed in response to the operation related to the image processing function is written.

In this way, even in the case where the different types of the image processing functions are operated in the similar procedures, it is possible to call the processing module that corresponds to the image processing function via the common calling processing.

(v) A preferred aspect of the present invention includes the image processing method in which the processor executing the script and the native instruction sequence related to the image processing includes: instructing the execution of the image processing function selected by the user; receiving the instruction from the controller and managing the progress of the plural procedures constituting the image processing function; and executing the processing module in which processing according to each of the procedures of the image processing function is written as the script. In the instruction step, the identifier that corresponds to each of the image processing functions is assigned to the image processing function, and the common instruction to the image processing functions is provided. In the management step, the processing module that corresponds to the assigned identifier is called and executed via the calling processing that is common to the image processing functions.

The preferred aspects of the present invention include a combination of any of the above-described aspects.

Various modified embodiments of the present invention may be provided in addition to the above-described embodiments. Such modified embodiments should not be construed as not falling within the scope of the present invention. The present invention is embodied by the claims and their equivalents, and should embrace all of the modifications within the scope of the above.

What is claimed is:

1. An image processing apparatus comprising:
a processor as hardware that executes a script and a native instruction sequence related to image processing;
a display that shows user-selectable image processing functions to a user;
an input device that accepts the image processing function selected by the user;
a controller that instructs execution of the image processing function selected by the user;
an operation manager that receives an instruction from the controller and manages progress of plural procedures constituting the image processing function; and a processing module that executes processing according to each of the procedures of the image processing function, wherein the processing module is written as the script that can be added or deleted, the controller assigns each of the different image processing functions shown on the display with an identifier that corresponds to each of the image processing functions; and when the input device accepts selection of any of the image processing functions, the controller provides the operation manager with an instruction to which the identifier corresponding to the selection is assigned, and the operation manager calls the processing module and causes the processor to execute the script of the processing module that corresponds to the assigned identifier via calling processing that is common to the image processing functions.

2. The image processing apparatus according to claim 1, wherein the processing module is the script that is written as processing of an operation that is performed for display of the image processing function, and the display of the image processing function is written in HTML, and the processing module is the script in JavaScript.

3. The image processing apparatus according to claim 1, wherein the operation manager calls the processing module in which processing that is executed in response to an operation related to the image processing function is written.

4. An image processing method in which a processor executes a script and a native instruction sequence related to image processing, the method comprising:

showing on a display user-selectable image processing functions to a user;

accepting via an input device the image processing function selected by the user;

instructing execution of the image processing function selected by the user;

receiving an instruction from a controller and managing progress of plural procedures constituting the image processing function; and executing a processing module in which processing according to each of the procedures of the image processing function is written as the script that can be added or deleted, wherein in the instructing, an identifier that corresponds to each of the image processing functions shown on the display is assigned to the image processing functions; and when the input device accepts selection of any of the image processing functions, an instruction to which the identifier corresponding to the selection is assigned is provided; and in the managing, the processing module that corresponds to the assigned identifier is called via calling processing that is common to the image processing functions; and the script of the processing module is executed.

* * * * *